US010952442B2

(12) United States Patent
Agarwal et al.

(10) Patent No.: US 10,952,442 B2
(45) Date of Patent: Mar. 23, 2021

(54) AUTOMATED PREPARATION OF BREADS

(71) Applicant: Mukesh Agarwal, Mumbai (IN)

(72) Inventors: Mukesh Agarwal, Mumbia (IN);
Arvind Kumar Sharma, Ahmedabad (IN)

(73) Assignee: Mukesh Agarwal, Mumbai (IN)

(*) Notice: Subject to any disclaimer, the term of this patent is extended or adjusted under 35 U.S.C. 154(b) by 192 days.

(21) Appl. No.: 15/773,713

(22) PCT Filed: Nov. 4, 2016

(86) PCT No.: PCT/IN2016/050383
§ 371 (c)(1),
(2) Date: May 4, 2018

(87) PCT Pub. No.: WO2017/077554
PCT Pub. Date: May 11, 2017

(65) Prior Publication Data
US 2018/0325124 A1 Nov. 15, 2018

(30) Foreign Application Priority Data
Nov. 6, 2015 (IN) .......................... 4231/MUM/2015

(51) Int. Cl.
*A21C 11/00* (2006.01)
*A21B 5/03* (2006.01)
(Continued)

(52) U.S. Cl.
CPC .............. *A21C 11/006* (2013.01); *A21B 5/03* (2013.01); *A21B 7/005* (2013.01); *A21C 1/00* (2013.01);
(Continued)

(58) Field of Classification Search
CPC .......... A47J 37/0611; A21B 5/03; A21B 5/04; B27N 3/203; B27N 3/20; A21C 11/006
(Continued)

(56) References Cited

U.S. PATENT DOCUMENTS 3,718,487 A * 2/1973 Brunner .................... A21B 5/03
99/353
4,508,025 A * 4/1985 Schultz ................. A47J 37/046
198/406
(Continued)

FOREIGN PATENT DOCUMENTS

CN 104490305 A 4/2015
IN 1937/DEL/2014 12/2014
(Continued)

OTHER PUBLICATIONS

Notification of Transmittal of the International Search Report and the Written Opinion of the International Searching Authority from corresponding PCT/IN2016/050383 dated Jan. 5, 2017.
(Continued)

*Primary Examiner* — Reginald Alexander
(74) *Attorney, Agent, or Firm* — Lando & Anastasi, LLP

(57) ABSTRACT

Apparatuses and methods for preparation of breads are described. The apparatuses include a press unit that can receive a dough ball and flatten the dough ball. The press unit includes a top plate and a bottom plate, each of which is in an inclined arrangement. The top plate swivels towards and away from the bottom plate. A dough ball is flattened between the top plate and the bottom plate. The bottom plate is heated, thereby heating a first face of the flattened dough in contact with the bottom plate. A flipper connected to at least one of the top plate and the bottom plate guides the flattened dough to a heated cooking surface. The guiding enables a second face of the flattened dough to come in
(Continued)

contact with the cooking surface, thereby heating the flattened dough and forming the bread.

27 Claims, 23 Drawing Sheets

(51) Int. Cl.
    *A21B 7/00*     (2006.01)
    *A21C 1/14*     (2006.01)
    *A21C 1/00*     (2006.01)
    *A47J 37/06*     (2006.01)

(52) U.S. Cl.
    CPC .......... *A21C 1/1425* (2013.01); *A47J 37/0611* (2013.01)

(58) Field of Classification Search
    USPC .... 99/349, 353, 348, 373, 395; 100/92, 315, 100/326
    See application file for complete search history.

(56) References Cited

U.S. PATENT DOCUMENTS

| | | | | |
|---|---|---|---|---|
| 4,683,813 A | * | 8/1987 | Schultz | A21B 1/44 100/144 |
| 4,724,755 A | * | 2/1988 | Escamilla | A21B 5/03 99/349 |
| 4,751,876 A | * | 6/1988 | Escamilla | A21B 5/00 198/406 |
| 5,996,476 A | | 12/1999 | Schultz | |
| 8,820,221 B2 | | 9/2014 | Israni | |
| 9,125,421 B2 | | 9/2015 | Israni et al. | |
| 9,277,752 B2 | | 3/2016 | Israni et al. | |
| 10,182,574 B2 | * | 1/2019 | Ruiz | A21B 5/03 |
| 2005/0072311 A1 | * | 4/2005 | Szymanski | A21B 5/03 99/349 |
| 2011/0059211 A1 | | 3/2011 | Chandi et al. | |
| 2011/0174169 A1 | | 7/2011 | Watanabe et al. | |
| 2015/0044340 A1 | | 2/2015 | Ruiz Preciado et al. | |
| 2015/0181893 A1 | * | 7/2015 | Israni | A21B 5/00 426/233 |
| 2015/0181894 A1 | | 7/2015 | Israni et al. | |
| 2015/0181895 A1 | | 7/2015 | Israni et al. | |
| 2015/0181897 A1 | | 7/2015 | Israni et al. | |

FOREIGN PATENT DOCUMENTS

| | | |
|---|---|---|
| JP | 2015512622 A | 4/2015 |
| KR | 20110084105 A | 7/2011 |

OTHER PUBLICATIONS

India Examination Report from corresponding India Application No. 201727016832 dated Sep. 11, 2017.
India Hearing Notice in Reference of Application No. 201727016832 dated Apr. 2, 2018.
International Preliminary Report on Patentability and Written Opinion from corresponding PCT/IN2016/050383 dated Jan. 5, 2017.

* cited by examiner

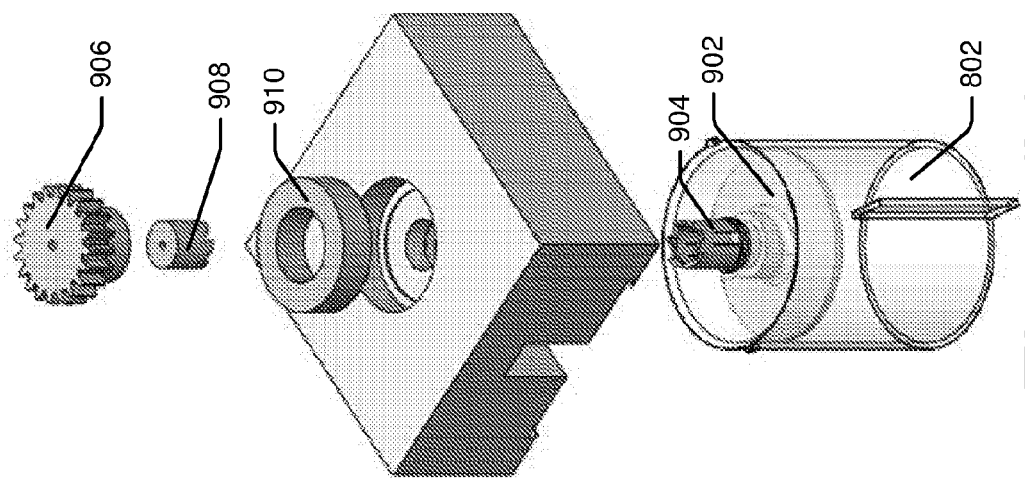
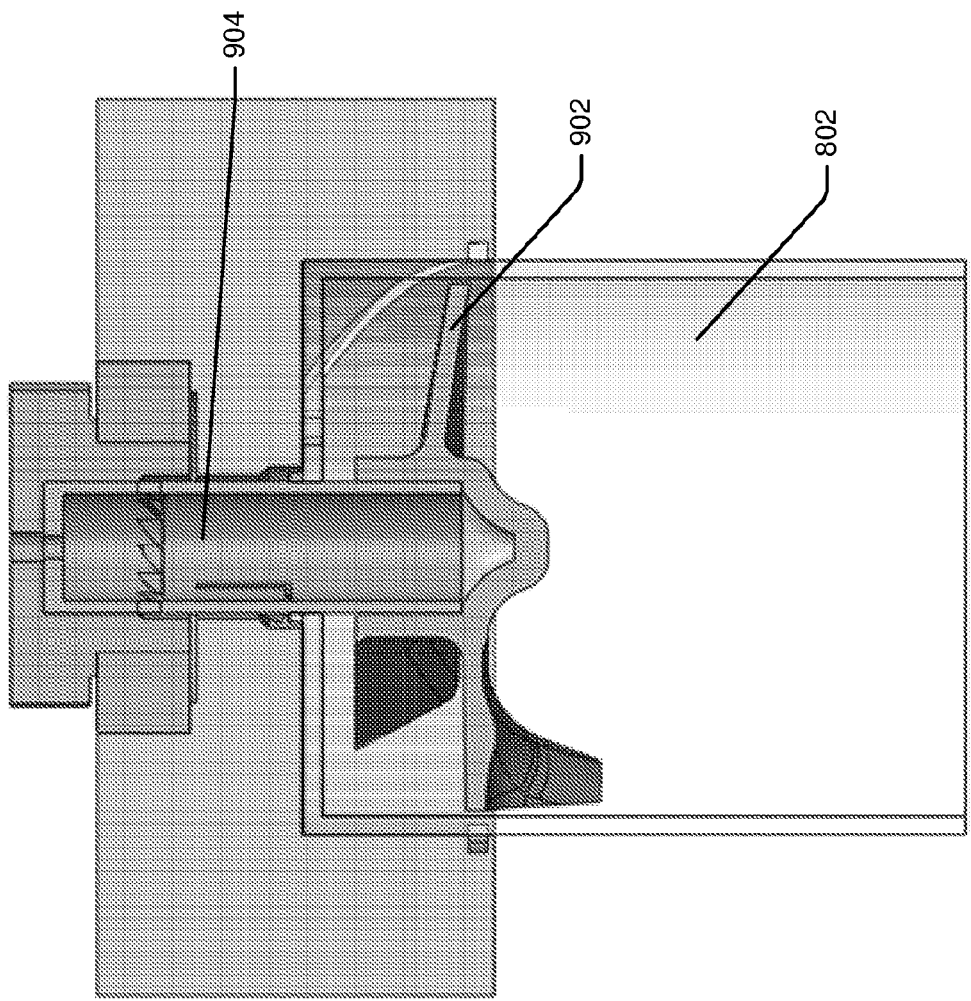
Fig. 9(b)
Fig. 9(a)

AUTOMATED PREPARATION OF BREADS

CROSS-REFERENCE TO RELATED APPLICATIONS

This application is a U.S. National Phase Application under 35 U.S.C. § 371 of International Application No. PCT/IN2016/050383, filed Nov. 4, 2016, which claims priority to Indian Application No. 4231/MUM/2015, filed Nov. 6, 2015. Both of which are hereby incorporated by reference in its entirety for all purposes.

TECHNICAL FIELD

The present subject matter relates, in general, to automated preparation of edible products and, in particular, to preparation of breads.

BACKGROUND

Automatic preparation of edible products has found increasing acceptance worldwide. Apparatuses that prepare edible products have one or more components that perform the steps involved in preparation of the edible products. For example, apparatuses for preparing breads include components for dispensing ingredients, kneading dough, flattening the dough, and cooking the dough.

BRIEF DESCRIPTION OF DRAWINGS

The features, aspects, and advantages of the present subject matter will be better understood with regard to the following description, and accompanying figures. The use of the same reference number in different figures indicates similar or identical features and components.

FIG. 9(a) illustrates a blade in the dough ball preparation unit, in accordance with an implementation of the present subject matter.

FIG. 9(b) illustrates the coupling of shaft of the blade with a gear of blade motor, in accordance with an implementation of the present subject matter.

DETAILED DESCRIPTION

Figure 1:
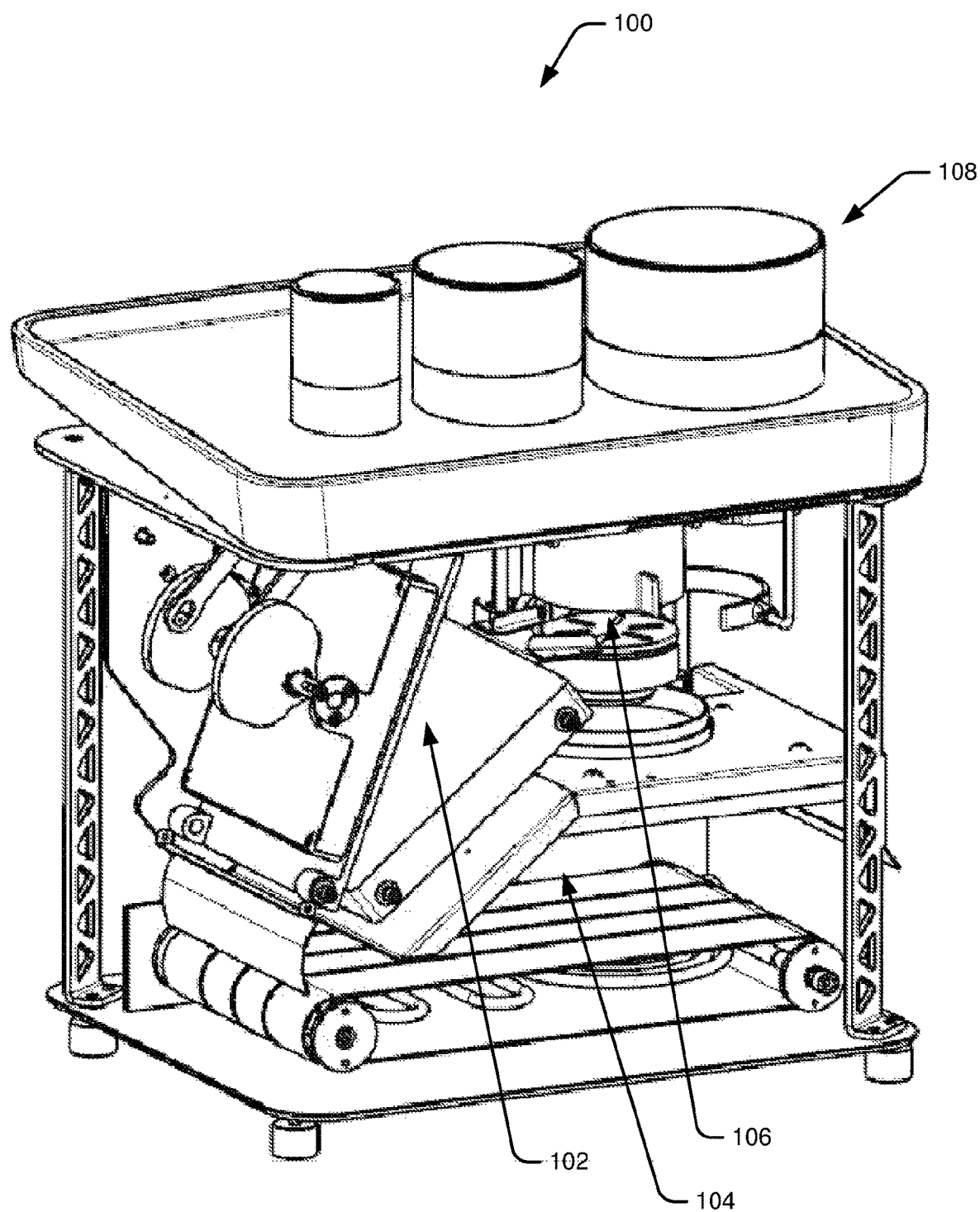
FIG. 1 illustrates a perspective view of an apparatus for preparation of breads, in accordance with an implementation of the present subject matter.

The present subject matter relates to apparatuses and methods for preparation of breads. The apparatuses and methods of the present subject matter may be used for preparing breads with minimal manual involvement.

Breads are edible products that are consumed by millions of people worldwide every day. Breads are prepared in various forms, such as Indian bread, roti, chapatti, and phulka. Conventionally, the preparation of breads is performed manually. The manual preparation of breads consumes a significant amount of time. Further, typically, the breads are consumed on the day they are prepared owing to the loss of freshness in the breads over a period of time. Therefore, households which consume breads as their staple food invest significant amount of time each day in preparation of breads. Automated apparatuses seek to reduce the manual intervention in the preparation of the breads.

Conventional apparatuses that automate the preparation of breads utilize complicated machinery. This may not only decrease the user friendliness of their operation, but also increase the power consumption. This may also increase the size of the apparatuses. Further, various steps, such as dough kneading and dough cooking, involved in the preparation of the breads performed by the conventional apparatuses may be incomplete or unsatisfactory. Therefore, the breads prepared by the conventional apparatuses may be unsatisfactory.

The present subject matter relates to apparatuses and methods for preparation of breads. The breads can be, for example, Indian bread, roti, chapatti, and phulka. With the apparatuses and methods of the present subject matter, breads ready for consumption can be prepared easily with minimal manual intervention. Moreover, the apparatuses of the present subject matter are compact, user friendly, and, at the same time, can effectively mimic the manual process to provide breads of consistent quality at a relatively faster rate. In particular, breads that are normally flipped at least once during manual cooking and/or puffed can be made automatically using the apparatuses and methods of the present subject matter.

The term "about" when referring to a numerical value is intended to encompass the values resulting from variations that can occur during the normal course of operation of the apparatus. Such variations are usually within plus or minus 10 percent of the stated numerical value.

In an implementation of the present subject matter, an apparatus for preparation of breads includes a press unit that receives a dough ball and flattens the dough ball. The press unit includes a bottom plate in an inclined arrangement such that its first end is at a greater height compared to its second end. The press unit also includes a top plate disposed above the bottom plate. The top plate is hinged at its second end. The hinging of the top plate enables swiveling of the top plate away from, and towards the bottom plate. In operation, the dough ball is received between the top plate and the bottom plate. After receiving the dough ball, the top plate swivels towards the bottom plate. This results in flattening of the dough ball. The bottom plate can be heated to a first predetermined temperature, so that a first face of the bread, which is in contact with the bottom plate, gets heated during the flattening. In one implementation, the top plate may also be heated. The top plate swivels away from the bottom plate upon elapse of a predetermined time period, after flattening the dough ball.

The flattened dough glides out from between the top plate and the bottom plate due to the inclined arrangement of the press unit. The gliding flattened dough is received by a flipper, which is connected to at least one of the second end of the top plate and the second end of the bottom plate. The flipper guides the flattened dough such that the flattened dough flips and falls onto a cooking surface that is placed below the press unit. As a result, a second face of the flattened dough comes into contact with the cooking surface. A first portion of the cooking surface is heated to a second predetermined temperature. This enables cooking the flattened dough through the second face, thereby forming the bread.

Since both faces of the flattened dough get heated, the bread formed is well cooked. This also ensures a cooking method that simulates a manual cooking method, which involves, first, heating the first face, and then, flipping the flattened dough for heating the second face. Further, since the heating of both faces of the flattened dough is ensured by utilizing a simple flipper connected to at least one of the top plate and the bottom plate, the apparatus is devoid of any complicated machinery for flipping the flattened dough. This makes the apparatus compact. Further, since the movement of the flattened dough from the press unit to the cooking surface utilizes gravity, the use of a separate transfer mechanism for transferring of the flattened dough from the press unit to the cooking surface is eliminated. This further enables decreasing the size, weight, and power consumption of the apparatus.

In an implementation, in addition, a puffing unit can be used to provide heat from the top and puff the bread after it has been cooked. Thus, the apparatus provides the flexibility to produce both puffed and non-puffed breads.

The above and other features, aspects, and advantages of the subject matter will be better explained with regard to the following description, appended claims, and accompanying figures. It should be noted that the description and figures merely illustrate the principles of the present subject matter along with examples described herein and, should not be construed as a limitation to the present subject matter. It is thus understood that various arrangements may be devised that, although not explicitly described or shown herein, embody the principles of the present disclosure. Moreover, all statements herein reciting principles, aspects, and examples thereof, are intended to encompass equivalents thereof. Further, for the sake of simplicity, and without limitation, the same numbers are used throughout the drawings to reference like features and components.

FIG. 1 illustrates a perspective view of an apparatus 100 for preparation of breads, in accordance with an implementation of the present subject matter. The apparatus 100 includes a press unit 102, which receives a dough ball and flattens the dough ball. The apparatus 100 also includes a cooking unit 104, which includes a cooking surface, on which the flattened dough is heated for preparation of bread. The apparatus 100 may also include a dough ball preparation unit 106, which prepares a dough ball from ingredients for the preparation of the bread. In addition, the apparatus 100 may also include a dispensing unit 108, which includes a plurality of ingredient chambers that store the ingredients for the preparation of the bread.

Figure 2:
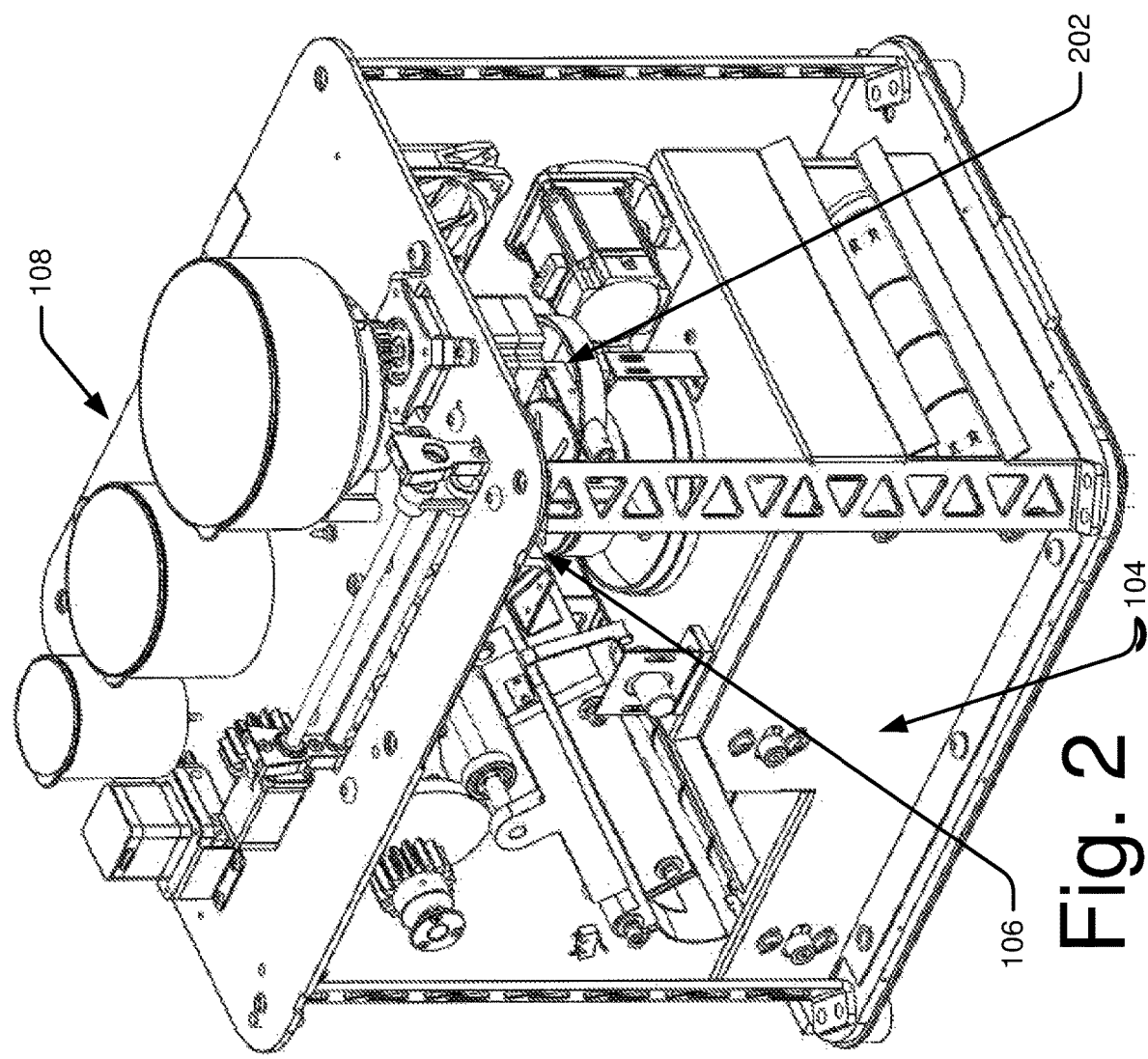
FIG. 2 illustrates a perspective view of the apparatus, in accordance with an implementation of the present subject matter.

FIG. 2 illustrates a perspective view of the apparatus 100, in accordance with an implementation of the present subject matter. The dispensing unit 108 includes the plurality of ingredient chambers for storing the ingredients for the preparation of the bread. The ingredients for preparation of the bread include flour, water, and, optionally, oil. Therefore, the dispensing unit 108 includes different ingredient chambers, one for storing each of flour, water, and oil. Here, plates in the press unit 102 are shown in a closed position, i.e., close to each other. The plates in the press unit 102 will be described with reference to FIG. 3. The plurality of ingredient chambers will be described with reference to FIG. 5. The flour may be, but is not restricted to, wheat flour, white flour, or the like. The dispensing unit 108 dispenses the ingredients in pre-set amounts to the dough ball preparation unit 106, which mixes and, subsequently, kneads the ingredients.

The mixing and kneading of the ingredients results in the formation of a dough ball. The dough ball is then transferred to the press unit 102. In an implementation, the transferring is performed by a transfer mechanism 202. Upon transfer of the dough ball, the press unit 102 flattens the dough ball. In addition, the press unit 102 can also heat the flattened dough from at least one side. The flattened dough is then passed on to the cooking unit 104. The flattened dough is heated in the cooking unit 104 for preparation of the bread.

In one implementation, the apparatus 100 is powered by a power supply module (not shown in Fig.), which receives power from a household power supply, such as a 220V Alternating Current (AC) supply. The power supply module may also include a battery that acts as a backup power supply to the apparatus 100. Therefore, during the operation of the apparatus 100, if the AC supply goes off, for example, due to power outage, the battery powers the apparatus 100 to complete at least one cycle of bread preparation process before stopping the apparatus 100. This ensures that the components of the apparatus continue to receive power during their operations. Therefore, damage to the components is prevented. Further, this also prevents wastage of the ingredients due to stoppage of the components in the middle of their operation.

Figure 3:
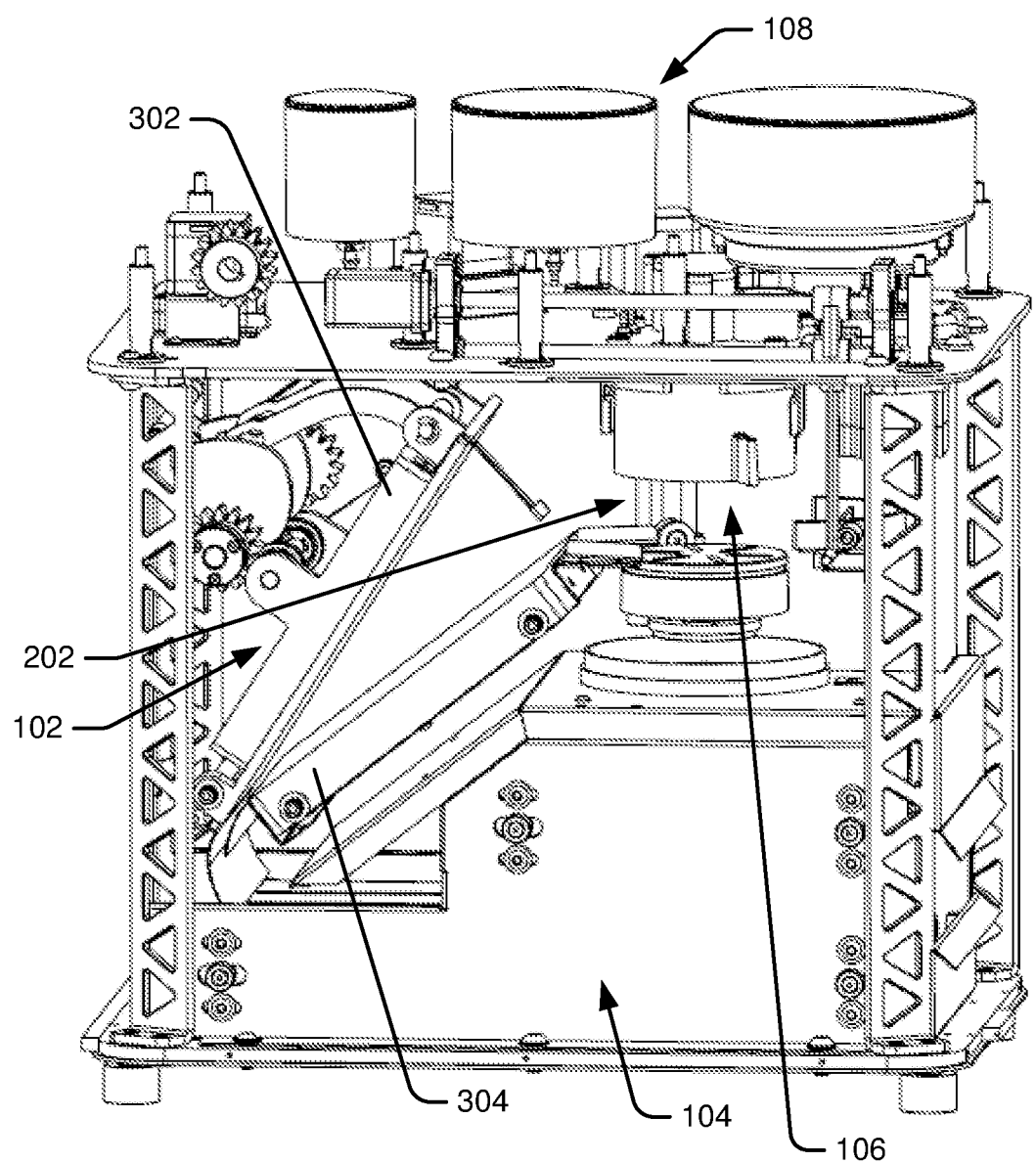
FIG. 3 illustrates a side view of the apparatus, in accordance with an implementation of the present subject matter.

FIG. 3 illustrates a side view of the apparatus 100, in accordance with an implementation of the present subject matter. The press unit 102 includes a top plate 302 and a bottom plate 304. The dough ball is received in the press unit 102 from the dough ball preparation unit 106 by the action of the transfer mechanism 202, as will be discussed in detail later. The dough ball gets pressed between the top plate 302 and the bottom plate 304 due to swiveling of the plates. The pressing of the dough ball causes the flattening of the dough ball. The operation of the press unit 102 for pressing of the dough ball is explained later with respect to FIGS. 11 and 12. The flattened dough then slips onto the cooking unit 104 from the bottom plate 304 and is flipped in this process.

Figure 4:
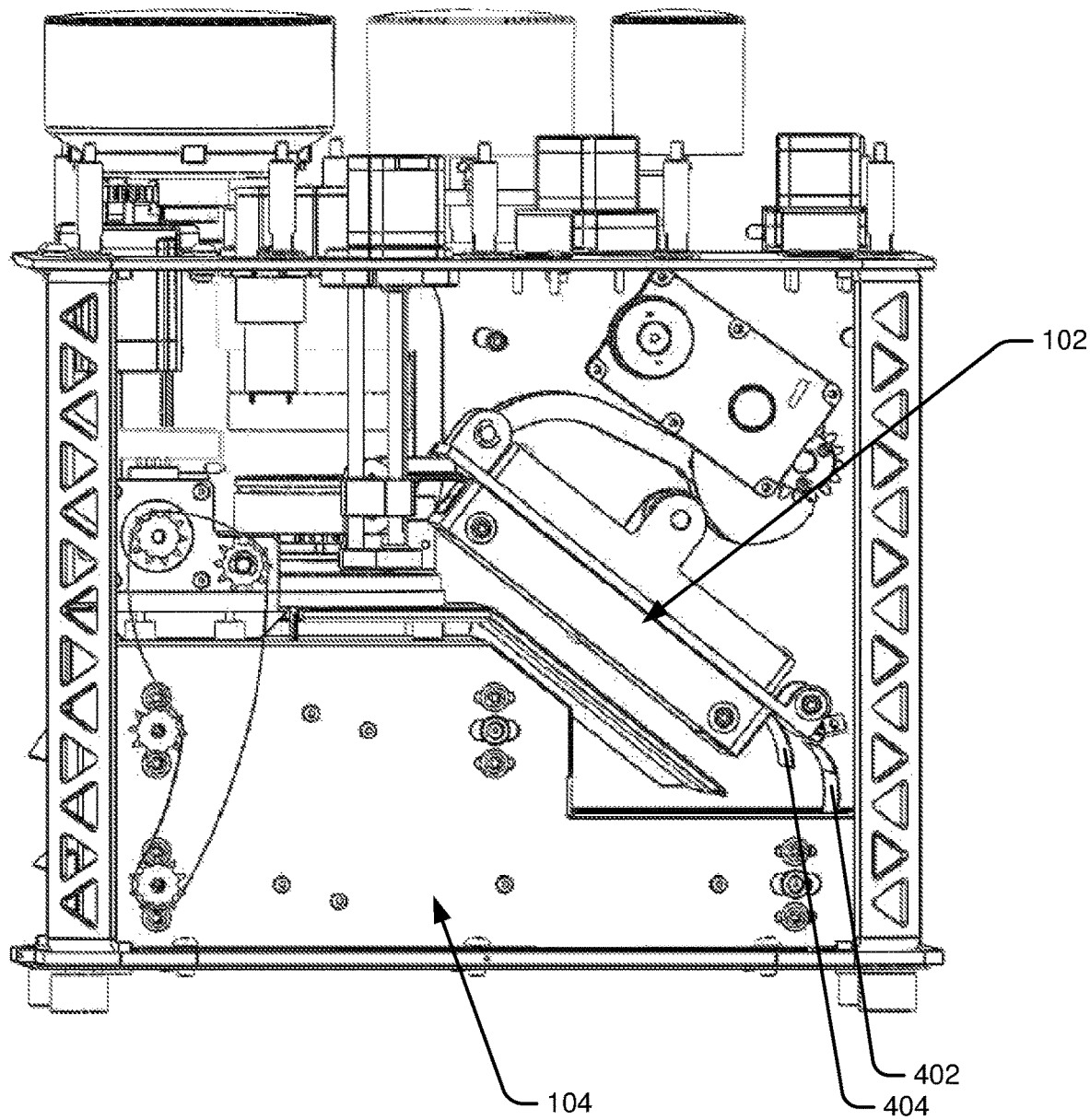
FIG. 4 illustrates a side view of the apparatus, in accordance with an implementation of the present subject matter.

FIG. 4 illustrates another side view of the apparatus 100, in accordance with an implementation of the present subject matter. In addition to the top plate 302 and the bottom plate 304, the press unit 102 includes a flipper. The flipper includes at least one of a top flipper 402 and a bottom flipper 404. When the dough ball is flattened in the press unit 102 and passes on to the cooking unit 104, the dough ball is guided by the flipper. The flipper causes flipping of the flattened dough. The structure and arrangement of the flipper and flipping of the flattened dough is explained later with respect to FIGS. 11 and 12.

As mentioned earlier, the apparatus 100 may include the dispensing unit 108 for holding and dispensing ingredients for the preparation of the bread.

Figure 5:
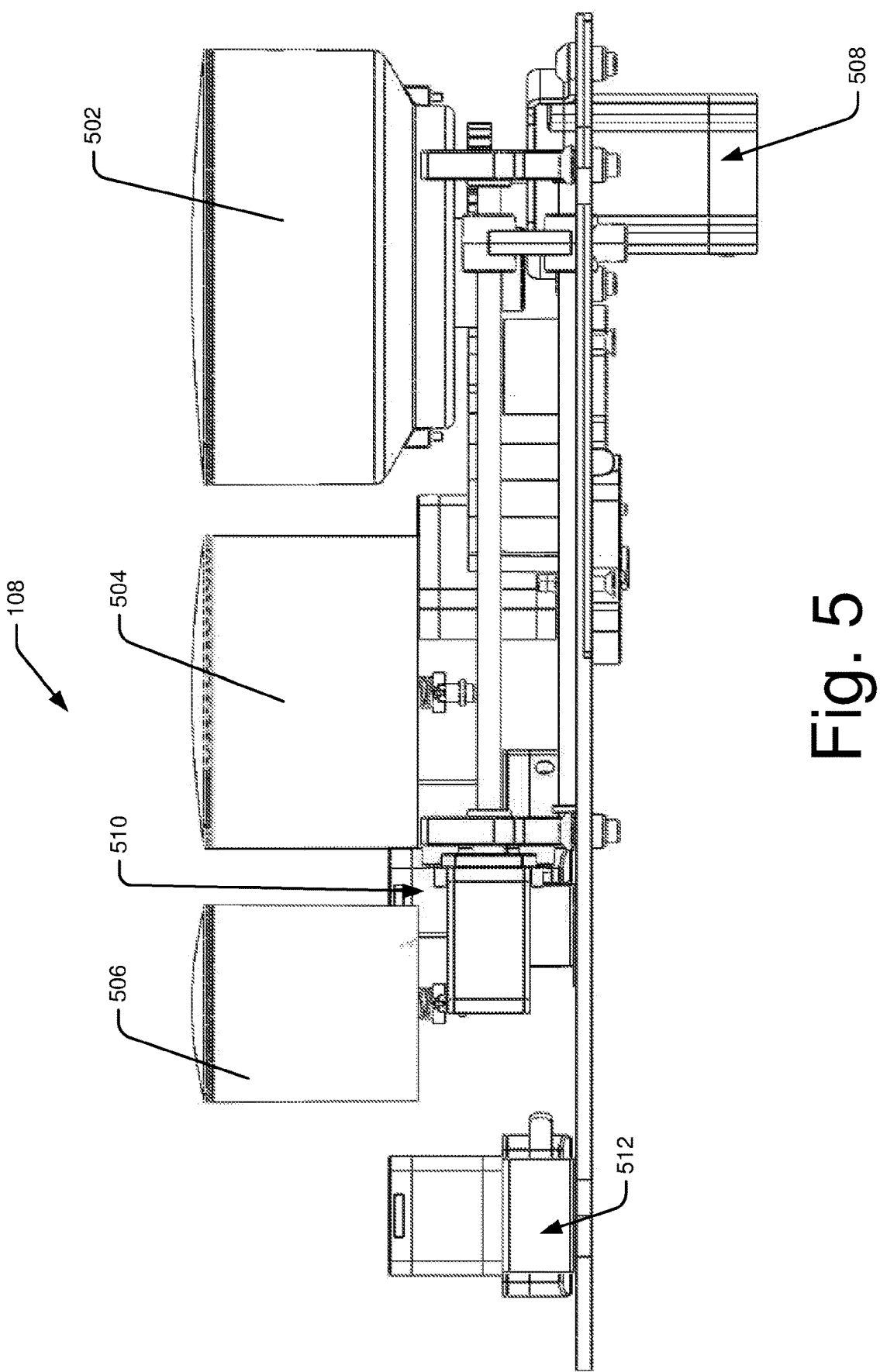
FIG. 5 illustrates a dispensing unit, in accordance with an implementation of the present subject matter.

FIG. 5 illustrates the dispensing unit 108, in accordance with an implementation of the present subject matter. The dispensing unit 108 includes a plurality of ingredient chambers to hold an ingredient each for preparation of the bread. The ingredients include flour and one or more liquids, such as water and oil. For example, the flour is stored in a flour chamber, and a liquid ingredient is stored in a chamber designated for the liquid ingredient. Accordingly, in one implementation, the dispensing unit 108 includes three ingredient chambers—a flour chamber 502, water chamber 504, and oil chamber 506—each for storing one of the three ingredients. In an example, the flour chamber 504, the water chamber 506, and the oil chamber 506 have the capacity to store ingredients for preparation of ten breads. In an implementation, when a user selects the number of breads to be prepared by the apparatus, the dispensing unit 108 may check if the ingredient chambers have sufficient ingredients for preparation of that many number of breads. The checking may be performed based on, for example, weight or volume of the ingredients in the plurality of ingredient chambers. If the ingredient chambers do not have the sufficient amount of ingredients, the apparatus 100 may indicate an error. The apparatus 100 may also indicate an error if any of the ingredient chambers is not placed properly.

The dispensing unit 108 also includes a dispensing mechanism connected to each ingredient chamber for dispensing ingredients stored in the ingredient chamber to the dough ball preparation unit 106. In one implementation, the dispensing mechanism can dispense predetermined quantity of ingredients for the preparation of one unit of bread at a time. In an example, the predetermined quantity of ingredients may be about 21 grams of flour, about 14 ml of water, and about 1 ml of oil. In another example, depending on the softness of bread and amount of oil selected by a user, the proportion of water and oil used may be changed. The dispensing mechanisms includes a flour motor 508, for dispensing the flour, a water peristaltic pump 510, for dispensing water, and an oil peristaltic pump 512, for dispensing oil.

In an implementation, the flour motor 508, the water peristaltic pump 510, and the oil peristaltic pump 512 are indexed for enabling them to dispense predetermined quantities of the ingredients. Indexing, in this context, refers to the precise rotation or movement of the motor/pump through a certain number of degrees. For example, the water peristaltic pump 510 may be indexed such that a rotor inside the water peristaltic pump 510 stops rotating when the rotor completes half of its complete rotation, so that the volume of water dispensed into the dough ball preparation unit 106 is half the volume that would have been dispensed had the rotor completed its rotation. Similarly, the indexing can be performed for any predetermined degree of rotation of the pump. To enable accurate indexing, the water peristaltic pump 510 and the oil peristaltic pump 512 may include stepper motors. The flour motor 508 and its dispensing will be explained in detail with respect to FIGS. 6 and 7.

The indexing of the flour motor 508, the water peristaltic pump 510, and the oil peristaltic pump 512 may be performed based on a selected softness of the bread. For example, if a soft bread is selected, more water is to be added to the bread. Therefore, the indexing of the water peristaltic pump 510 is performed in such a way that more water is dispensed.

In order to adjust the indexing of the water peristaltic pump 510 and the oil peristaltic pump 512 based on the selected softness, the indexing may be controlled by a processor (not shown in Fig.) in the apparatus 100. The processor can provide control signals to the respective drivers (not shown in Fig.) of the water peristaltic pump 510 and the oil peristaltic pump 512 based on the softness selected. Based on the control signals provided, the water peristaltic pump 510 and/or the oil peristaltic pump 512 may rotate for a predetermined number of degrees, in order to dispense a predetermined amount of ingredients. The processor is explained with reference to FIGS. 16(*a*) and 16(*b*).

A user operating the apparatus 100 may be provided with options for selecting the softness of bread. Based on the option selected by the user, the processor may index the water peristaltic pump 510 appropriately by providing control signals to the driver of the water peristaltic pump 510. Similarly, the processor may index the oil peristaltic pump 512 by providing control signals to the driver of the oil peristaltic pump 512 based on the amount of oil that the user selects. For example, if the user selects a 'less oil' option, the processor may index the oil peristaltic pump 512 such that 0.5 ml of oil is dispensed, and if the user selects a 'normal oil' option, the processor may index the oil peristaltic pump 512 such that 1 ml of oil is dispensed.

Figure 6:
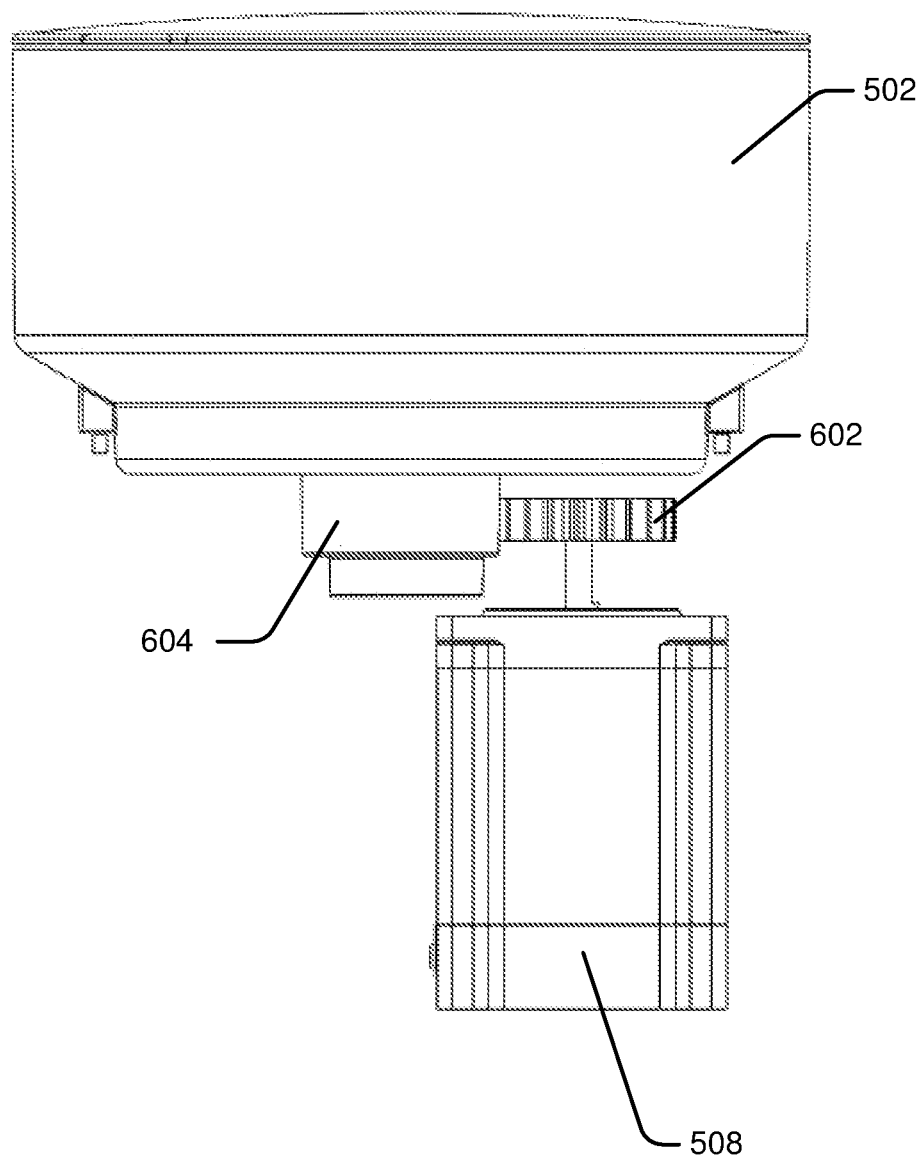
FIG. 6 illustrates the connection between a flour motor and a flour chamber, in accordance with an implementation of the present subject matter.

FIG. 6 illustrates the connection between the flour motor 508 and the flour chamber 502, in accordance with an implementation of the present subject matter. The flour motor 508 rotates a first gear 602 on its rotation. The first gear 602 is connected to a second gear 604, so that the second gear 604 rotates when the first gear 602 rotates. In an implementation, the flour motor 508 is a stepper motor. To dispense the predetermined quantity of the flour, the flour motor 508 may be appropriately indexed. The indexing of the flour motor 508 may be performed at the time of manufacturing using the processor, which may provide control signals to a driver (not shown in Fig.) of the flour motor 508. The indexing of the flour motor 508 to dispense predetermined quantity of the flour is explained with respect to FIGS. 7(a) and 7(b).

Figure 7A:
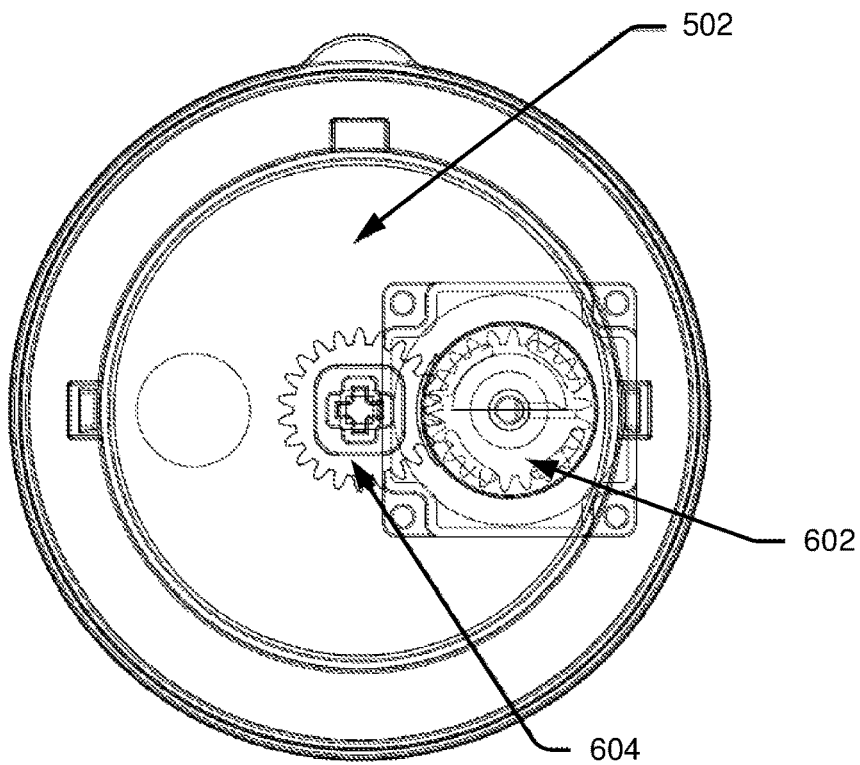
FIG. 7(a) illustrates the top view of the flour chamber, in accordance with an implementation of the present subject matter.

FIG. 7(a) illustrates the top view of the flour chamber 502, in accordance with an implementation of the present subject matter. As mentioned earlier, the first gear 602 of the flour motor 508 engages with the second gear 604 of the flour chamber 502. The second gear 604 in the flour chamber 502 rotates a disk (not shown in Fig.) in the flour chamber 502. Below the disk is a kneading chamber (not shown in Fig.), which is part of the dough ball preparation unit 106, and to which the ingredients have to be dispensed. The kneading chamber has a flour opening, through which the flour can be received inside the kneading chamber.

Figure 7B:
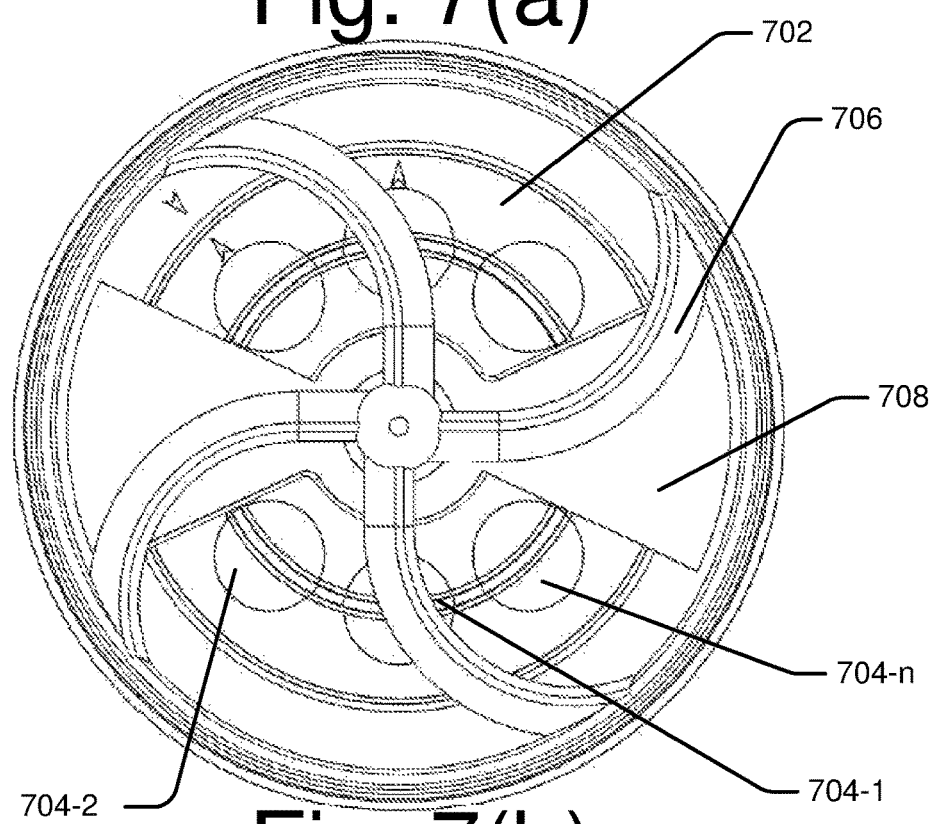
FIG. 7(b) illustrates the top view of the flour chamber, in accordance with an implementation of the present subject matter.

FIG. 7(b) illustrates top view of the flour chamber 502, in accordance with an implementation of the present subject matter. As mentioned earlier, the flour chamber includes a disk 702 placed on the second gear 604. When the flour motor 508 starts rotating, the second gear 604 causes the disk 702 to rotate in the flour chamber 502. The disk 702 includes a plurality of cavities, such as 704-1, 704-2, ..., 704-n. Each cavity is designed in such a way that it can carry a fixed quantity of flour.

When the disk 702 rotates, the cavities also rotate, causing them to be directly above the flour opening in the kneading chamber at various points of time. When a cavity is directly above the flour opening, the flour carried by that cavity is dispensed into the kneading chamber through the flour opening. Since each cavity can carry a fixed quantity of the flour, in order to dispense the predetermined quantity of the flour, the flour motor 508 is indexed such that a predetermined number of the plurality of cavities come directly above the flour opening.

Above the disk 702 is a dispenser blade 706, also connected to the second gear 604, rotating along with the disk 702. The rotation of the dispenser blade 706 causes flour from the top of the flour chamber 502 to be dispensed to the plurality of cavities. This fills a cavity when the cavity becomes empty. A stationary blade 708 is placed directly above the flour opening. The stationary blade 708 ensures that when a cavity directly above the flour opening is dispensing flour inside the flour opening, additional flour is not dispensed inside that cavity. Therefore, always, a fixed quantity of flour is dispensed from a cavity to the flour opening.

Figure 7C:
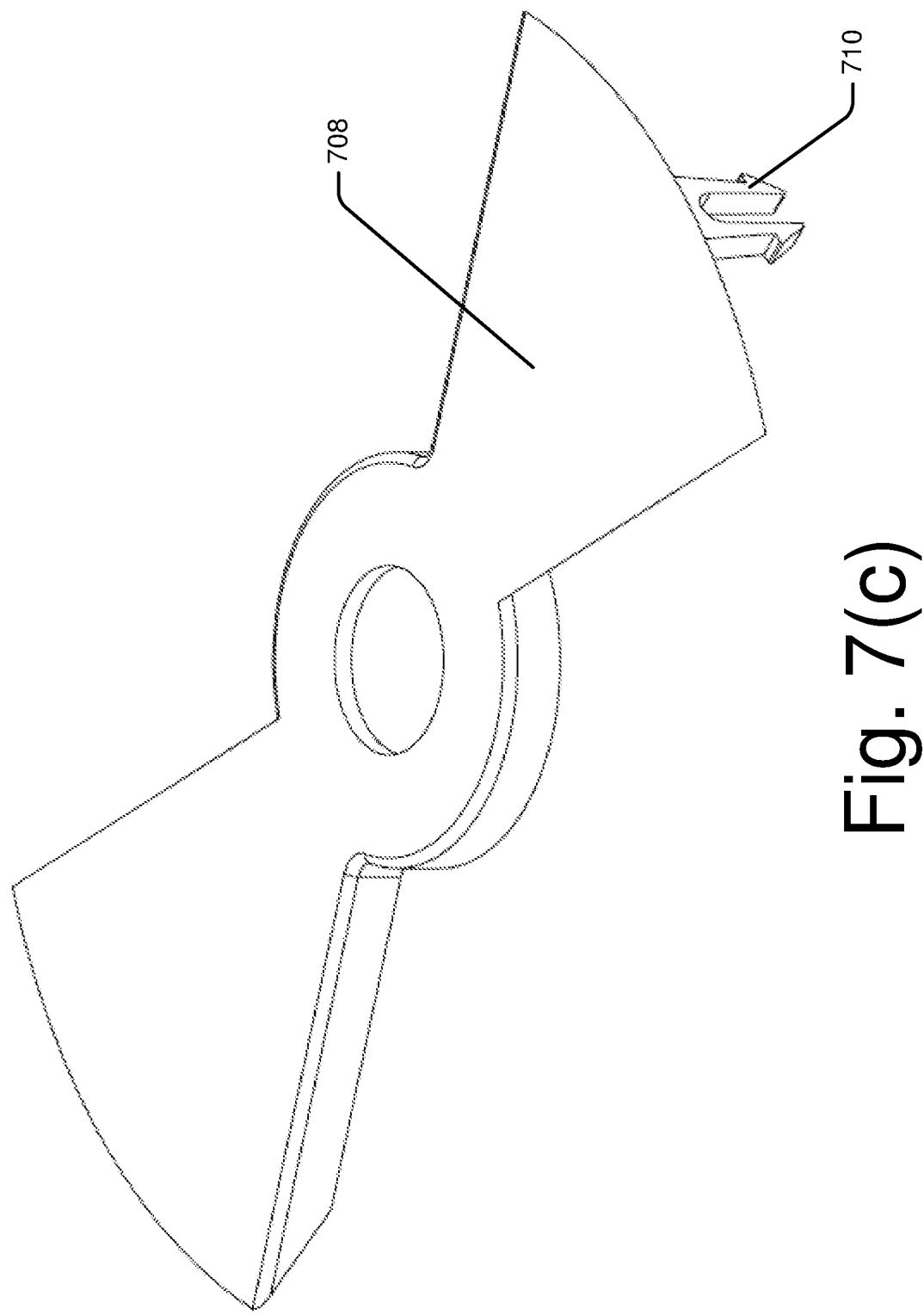
FIG. 7(c) illustrates a stationary blade in the flour chamber, in accordance with an implementation of the present subject matter.

FIG. 7(c) illustrates the stationary blade 708, in accordance with an implementation of the present subject matter. As illustrated, the stationary blade 708 includes a notch 710. When a cavity is directly above the flour opening, the notch 710 may come into contact with the flour in that cavity, which enables the flour to get dispensed into the flour chamber 502. This ensures that the entire quantity of flour in the cavity can be dispensed into the flour chamber 502.

While the flour is dispensed from the flour chamber 502, the water and oil are also dispensed simultaneously from their respective ingredient chambers into the kneading chamber of the dough ball preparation unit 106. Upon dispensing of the predetermined quantities of ingredients into the kneading chamber, the ingredients are mixed and then kneaded to prepare a dough ball.

Figure 8:
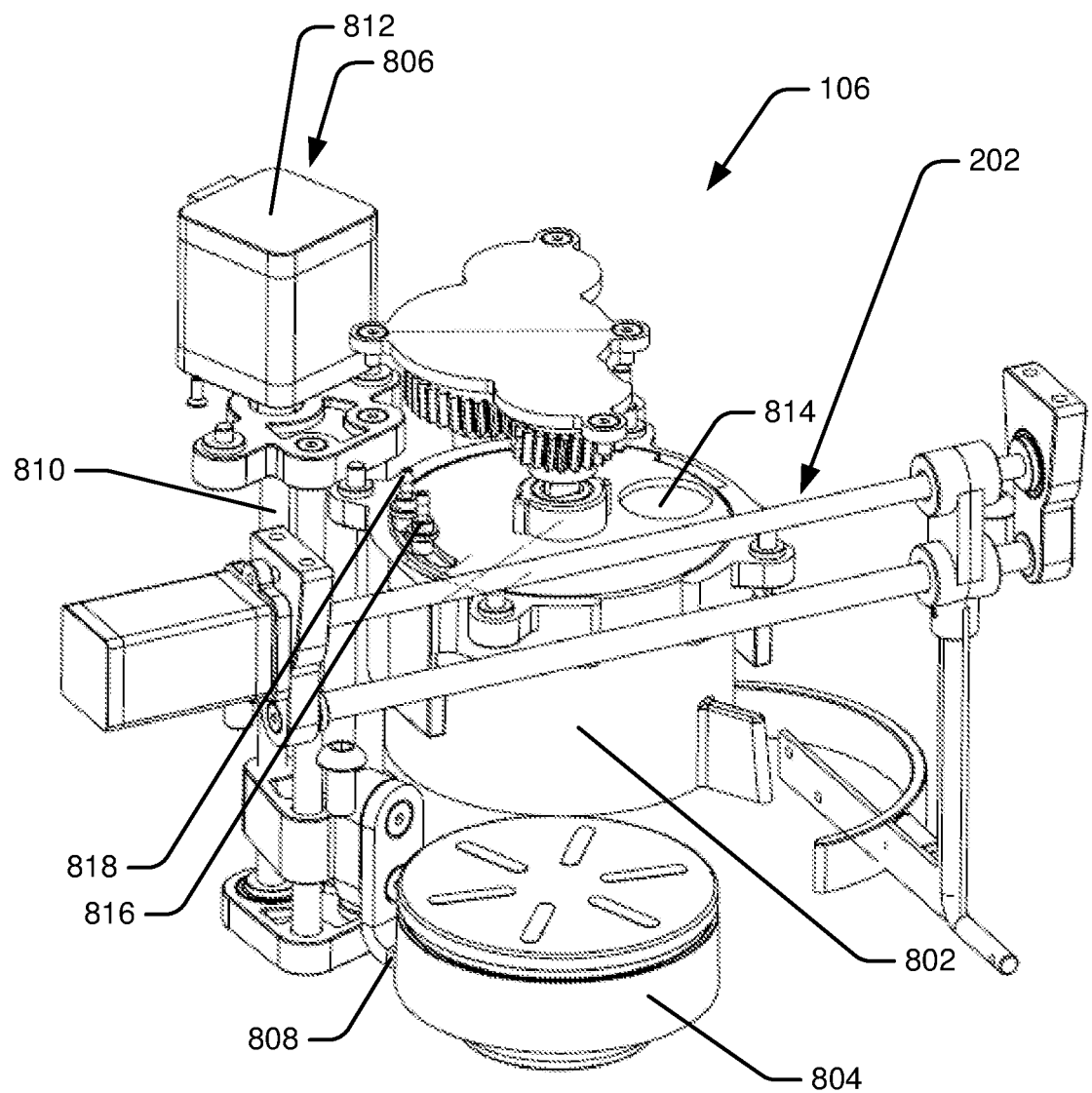
FIG. 8 illustrates dough ball preparation unit, in accordance with an implementation of the present subject matter.

FIG. 8 illustrates the dough ball preparation unit 106, in accordance with an implementation of the present subject matter. The dough ball preparation unit 106 includes the kneading chamber 802, in which the mixing and kneading of the ingredients takes place. To enable the mixing and kneading, the dough ball preparation unit 106 includes a blade (shown in FIG. 9) rotated by a blade motor. The kneading chamber 802 has an opening at its bottom. When the dough ball preparation process begins, the kneading chamber 802 is covered at its bottom by a kneading plate 804. A base position of the kneading plate 804 is outside and below the kneading chamber 802. The kneading plate 804 is moved upwards from the base position inside the kneading chamber 802 by a kneading plate transfer unit 806. The kneading plate transfer unit 806 includes a kneading plate transfer arm 808 that is coupled to the kneading plate 804. The kneading plate transfer arm 808 is connected to a nut. The nut can travel along a shaft 810 in the kneading plate transfer unit 806. The shaft 810 is rotated by a kneading plate transfer motor 812. Therefore, the kneading plate transfer arm 808 travels linearly along the shaft 810 when the shaft 810 is rotated by the kneading plate transfer motor 812. The linear motion of the kneading plate transfer arm 808 enables the vertical, i.e., upward and downward movement of the kneading plate 804 inside and outside the kneading chamber 802.

The kneading chamber 802 includes inlets through which the ingredients from the dispensing unit get dispensed into the kneading chamber. The inlets include the flour opening 814, water inlet 816, and oil inlet 818. When the dispensing of the ingredients has to begin, the kneading plate transfer unit 806 moves the kneading plate 804 inside the kneading chamber 802, so that the opening at the bottom of the kneading chamber 802 is covered. To initiate the dispensing of the ingredients, the kneading plate 804 is moved to a first position inside the kneading chamber 802. The first position in the kneading chamber 802 may be a predetermined distance below the blade. To enable stoppage of the kneading plate 804 when it reaches the first position, the kneading plate transfer unit 806 includes a first limit switch (not shown in Fig.). When the kneading plate 804 reaches the first position, the first limit switch activates, which leads to the stoppage of the kneading plate transfer motor 812.

When the kneading plate 804 reaches the first position, the flour motor 508 starts, so that the predetermined quantity of the flour is dispensed to the kneading chamber 802. In addition, the blade starts rotating, which results in spreading of the flour throughout the kneading chamber 802. Thereafter, the oil peristaltic pump 512, for dispensing oil to the kneading chamber 802, is activated. In an implementation, at this stage, a part of the volume of the oil needed for preparation of the bread is dispensed by the oil chamber 506. For example, if 1 ml of oil is required for the preparation of the bread, at this stage, 0.5 ml of oil is dispensed by the oil chamber 506. Thereafter, the water chamber 504 dispenses water to the kneading chamber 802. The water chamber 504 dispenses a portion of the water required for preparation of the bread. In an example, if the water required for the preparation of the bread is 14 ml, the water chamber 504 dispenses 7 ml of water. As mentioned earlier, the accurate dispensing of the predetermined quantities of the ingredients is facilitated by appropriate indexing of the flour motor 508, water peristaltic pump 510, and oil peristaltic pump 512. Further, as mentioned earlier, upon formation of a dough ball in the dough ball preparation unit 106, the transfer mechanism 202 moves the dough ball to the press unit. The transfer mechanism 202 is explained with respect to FIG. 10.

FIG. 9(a) illustrates the blade 902 in the dough ball preparation unit 106, in accordance with an implementation of the present subject matter. The blade 902 may be snap-fitted in the kneading chamber 802 for easy attachment and removal from the kneading chamber 802. A shaft 904 of the blade 902 is coupled to a motor (not shown in Fig.), for facilitating the rotation of the blade 902 in the kneading chamber 802.

The rotation of the blade 902 results in the mixing of the ingredients in the kneading chamber 802. Upon elapse of a first predetermined time after the kneading plate 804 moved to the first position, the kneading plate 804 moves downwards, inside the kneading chamber 802, to a second position. The first predetermined time includes a time period for which the ingredients are dispensed to the kneading chamber 802 and a time period during which rotation of the blade 902 takes place without further dispensing of ingredients.

At the first predetermined time period, the movement of the kneading plate 804 downwards, to the second position, enables the partially mixed ingredients in the kneading chamber 802 to spread throughout the kneading chamber 802. In an example, the second position is about 10 mm below the first position, but within the kneading chamber 802. Further, in an example, the first predetermined time is about 50 seconds. Of the 50 seconds, during the first about 20 seconds, the ingredients are dispensed to the kneading chamber 802.

When the kneading plate 804 is at the second position, the remaining portion of the water required for the preparation of the bread is dispensed to the kneading chamber 802. For example, if the total volume of water required for preparation of the bread is 14 ml, and 7 ml was dispensed when the kneading plate 804 was at the first position, the remaining 7 ml of water is dispensed when the kneading plate 804 is at the second position. The dispensing of the second portion of the water during rotation of the blade 902 enables a thorough mixing of the flour with the water. The thorough mixing results in formation of lumps.

Upon elapse of a second predetermined time after the kneading plate 804 reached the second position, the kneading plate 804 is moved upwards to a third position. The second predetermined time is selected such that the flour and water mix thoroughly and form lumps. In an example, the second predetermined time is about 14 seconds. The movement of the kneading plate 804 upwards to the third position and the simultaneous rotation of the blade 902 enable gathering the formed lumps and forming one big lump. In an example, the third position is about 8 mm above the second position, i.e., about 2 mm below the first position.

When a third predetermined time period has elapsed after the kneading plate 804 moved to the third position, the kneading plate 804 is again moved downwards, inside the kneading chamber 802, to a fourth position. The third predetermined time period is selected such that all lumps are gathered and the big lump is formed. The movement of the kneading plate 804 to the fourth position and the rotation of the blade 902 while the kneading plate 804 is at the fourth position enables shaping of the lump, and formation of a dough ball. The shaping of the lump to form the dough ball is facilitated by the design of the blade 902, which is explained in detail with reference to FIGS. 9(c) and 9(d).

When the kneading plate is at the fourth position, a second portion of oil required for the preparation of bread is dispensed to the kneading chamber. For example, if 0.5 ml of oil was added when the kneading plate was at the first position and 1 ml of oil is required for preparation of the bread, the remaining 0.5 ml of oil is dispensed when the kneading plate is at the fourth position. The dispensing of the oil when the kneading plate is at the fourth position aids in kneading and shaping of the dough ball. In an example, the third predetermined time period is 30 seconds. Further, in an example, the fourth position is 2 mm below the third position.

The kneading plate is allowed to remain at the fourth position for a fourth predetermined time, during which the dough ball takes shape. In an example, the fourth predetermined time is 20 seconds. Thereafter, the kneading plate moves, carrying the dough ball, to the base position. The rotation of the blade 902 when the kneading plate 804 is at the second, third, and the fourth positions constitutes kneading of the dough.

It will be understood that, while the kneading plate 804 moves to the first, second, third, and the fourth positions, the blade 902 keeps rotating. The movement of the kneading plate 902 to the various positions enables simulating a manual mixing and kneading of the ingredients. Therefore, the dough ball formed is similar to the dough ball formed with conventional hand kneading. The stoppage of the kneading plate at the second, third, and the fourth positions are achieved by appropriate indexing of the kneading plate transfer motor 812. Further, to enable stoppage of the kneading plate 804 when the kneading plate 804 reaches the base position, a second limit switch (not shown in Fig.) may be employed. The second limit switch may get activated when the kneading plate 804 reaches the base position, which enables stopping the kneading plate transfer motor 812.

FIG. 9(b) illustrates the coupling of the shaft 904 of the blade 902 with a gear 906 of the blade motor, in accordance with an implementation of the present subject matter. The shaft 904 is coupled to the gear 906 through a coupling 908. The coupling may be, for example, a ratchet coupling. The shaft 904 may be connected through bearing 910.

Figure 9D:
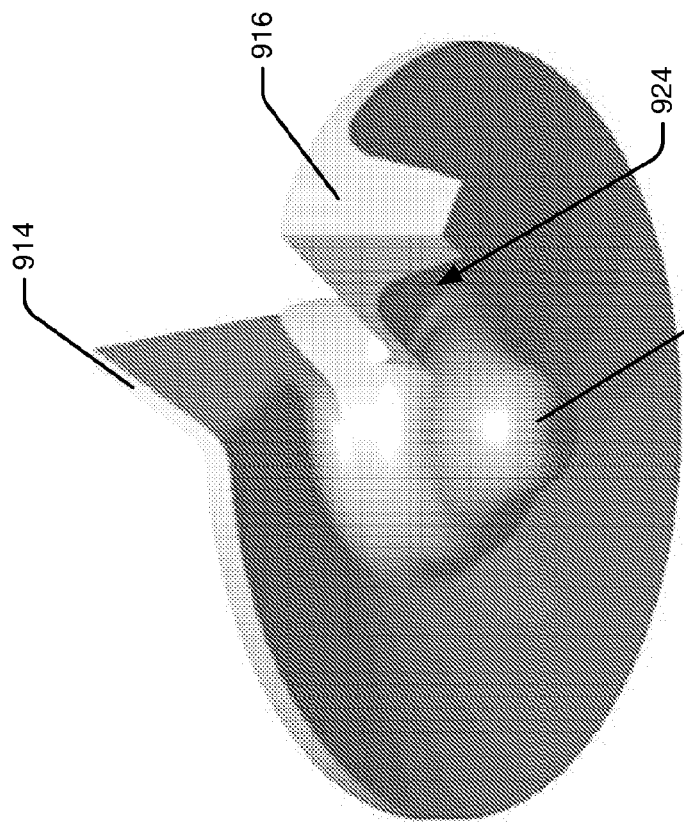
FIG. 9(d) illustrates an inverted view of the blade, in accordance with an implementation of the present subject matter.
Figure 9C:
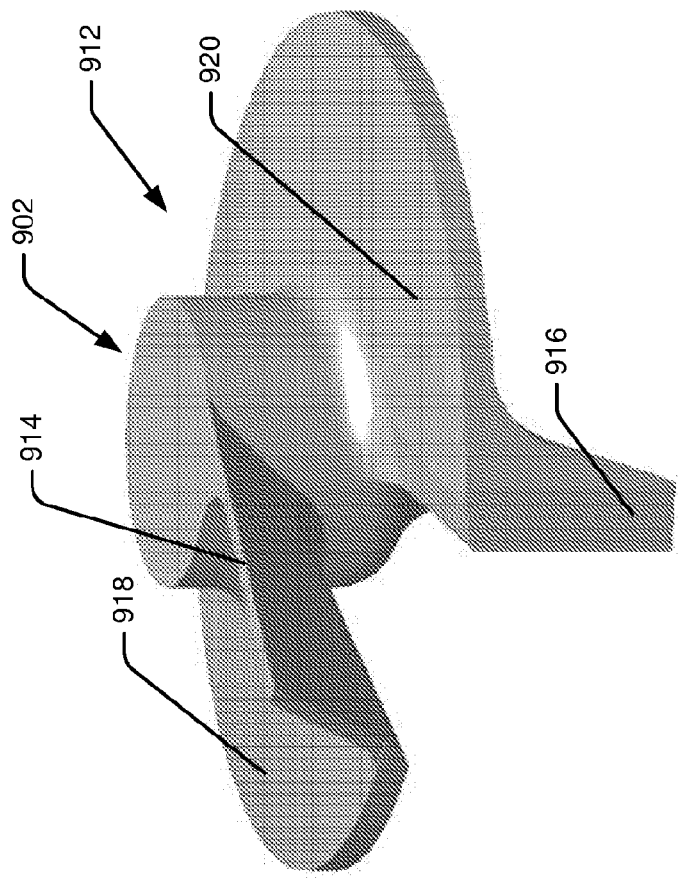
FIG. 9(c) illustrates design of the blade, in accordance with an implementation of the present subject matter.

FIG. 9(c) illustrates a perspective view of design of the blade 902, in accordance with an implementation of the present subject matter. The blade 902 includes a spiral portion 912, an upward extending portion 914, and a downward extending portion 916. The spiral portion 912 is such that a first part 918 of the spiral portion 912 is at a greater height compared to a second part 920 of the spiral portion 912. Initially, when the ingredients are dispensed in the kneading chamber 802, the dispensed ingredients come into contact with the spiral portion 912, the upward extending portion 914, and the downward extending portion 916, causing the thorough mixing of the ingredients during rotation of the blade 902. The shaping of the dough ball is aided by the downward extending portion 916 and center portion (not shown in Fig.) of the blade 902.

FIG. 9(d) illustrates an inverted view of the blade 902, illustrating the center portion 922, in accordance with an implementation of the present subject matter. As illustrated, between the center portion 922 and the downward extending portion 916, a curvature 924 is present. During rotation of the blade 902, the big lump is gathered below the curvature 924. This causes shaping of the big lump by the curvature 924, thereby shaping the dough ball.

Figure 9F:
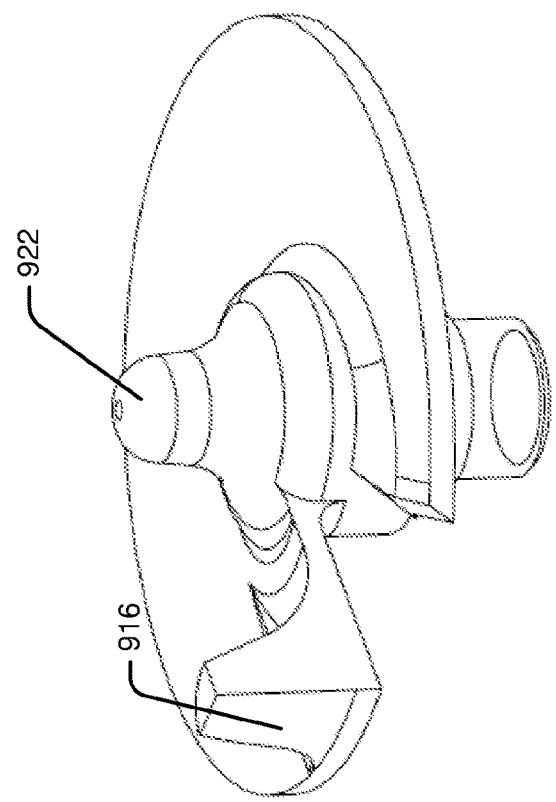
FIG. 9(f) illustrates a view of the blade, in accordance with an implementation of the present subject matter.
Figure 9E:
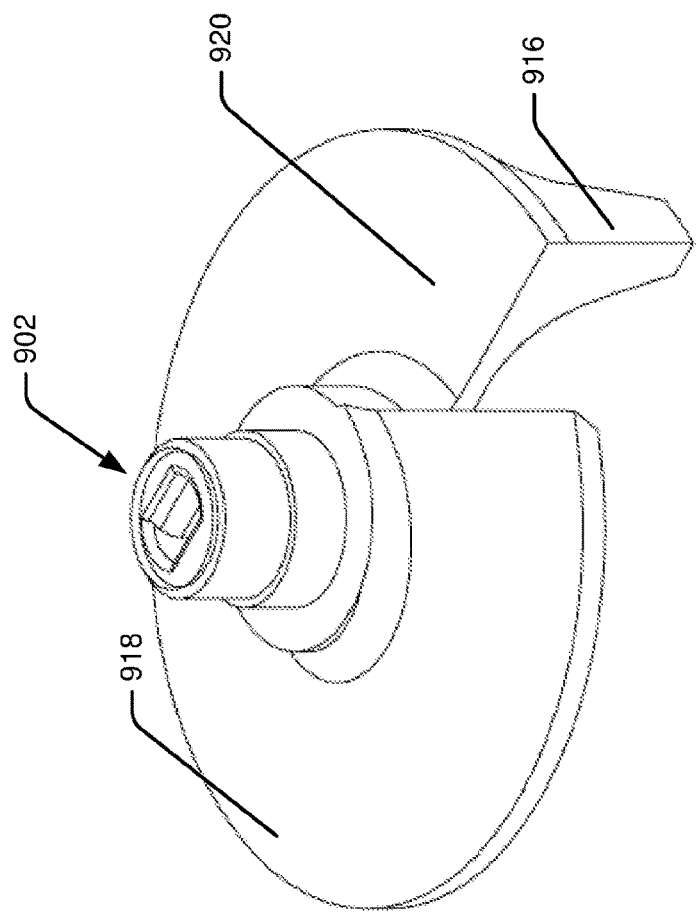
FIG. 9(e) illustrates a view of the blade, in accordance with an implementation of the present subject matter.

FIGS. 9(e) and 9(f) illustrate views of the blade 902, corresponding to the views 9(c) and 9(d), in accordance with an implementation of the present subject matter.

Figure 10:
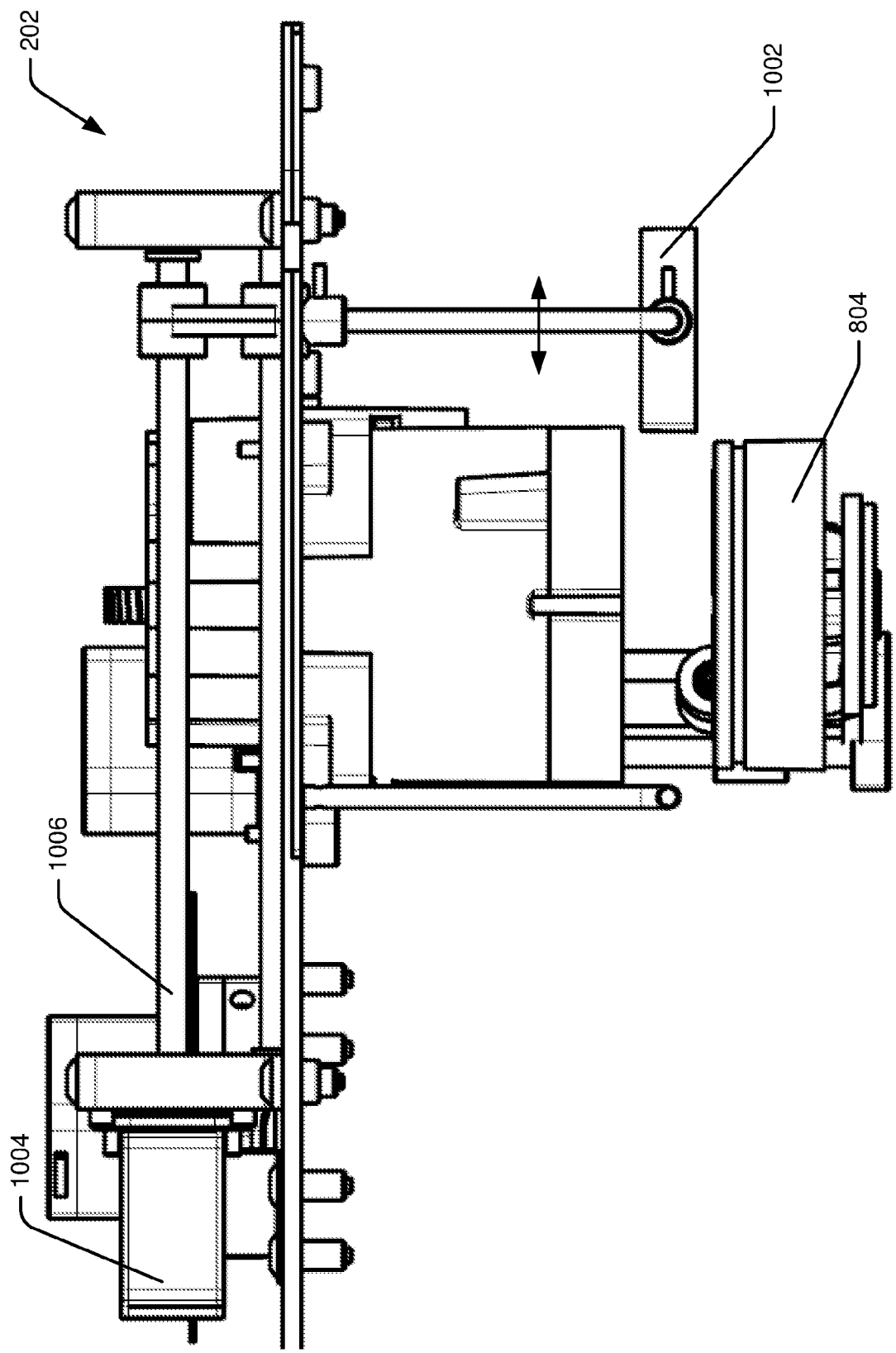
FIG. 10 illustrates a transfer mechanism, in accordance with an implementation of the present subject matter.

FIG. 10 illustrates the transfer mechanism 202, in accordance with an implementation of the present subject matter. The transfer mechanism 202 includes a transfer arm 1002, which moves from an innermost position to an outermost position in a horizontal direction, for transferring the dough ball. To enable movement of the transfer arm 1002 in the horizontal direction, the transfer arm 1002 is coupled to a transfer motor 1004. The transfer motor 1004 rotates a transfer shaft 1006. The rotational motion of the transfer shaft 1006 is converted into a linear motion of the transfer arm 1002 by a nut coupled to the transfer shaft 1006 as shown in the figure. The transfer arm 1002, coupled to the nut, therefore, moves in the horizontal direction (as indicated by the double-headed arrow). The transfer arm 1002 starts moving from its outermost position when the kneading plate 804 reaches its base position moving downwards from the kneading chamber 802, carrying the dough ball. Therefore, when the transfer arm 1002 crosses the kneading plate 804 while moving towards its innermost position, the dough ball on the kneading plate 804 is moved by the transfer arm 1002. Since the innermost position is proximate to the press unit 102, the transfer arm 1002 passes the dough ball on to the press unit 102, upon reaching its innermost position. Upon movement of the transfer arm 1002 to its innermost position, the transfer motor 1004 then reverses its direction, so that the transfer arm 1002 reaches its outermost position again. The stoppage of the transfer arm 1002 at its innermost and outermost positions are achieved with the help of third and fourth limit switches respectively (not shown in Fig.).

In an implementation, upon movement of the transfer arm 1002 to its outermost position, the kneading plate 804 is allowed to move up to its first position.

Figure 11:
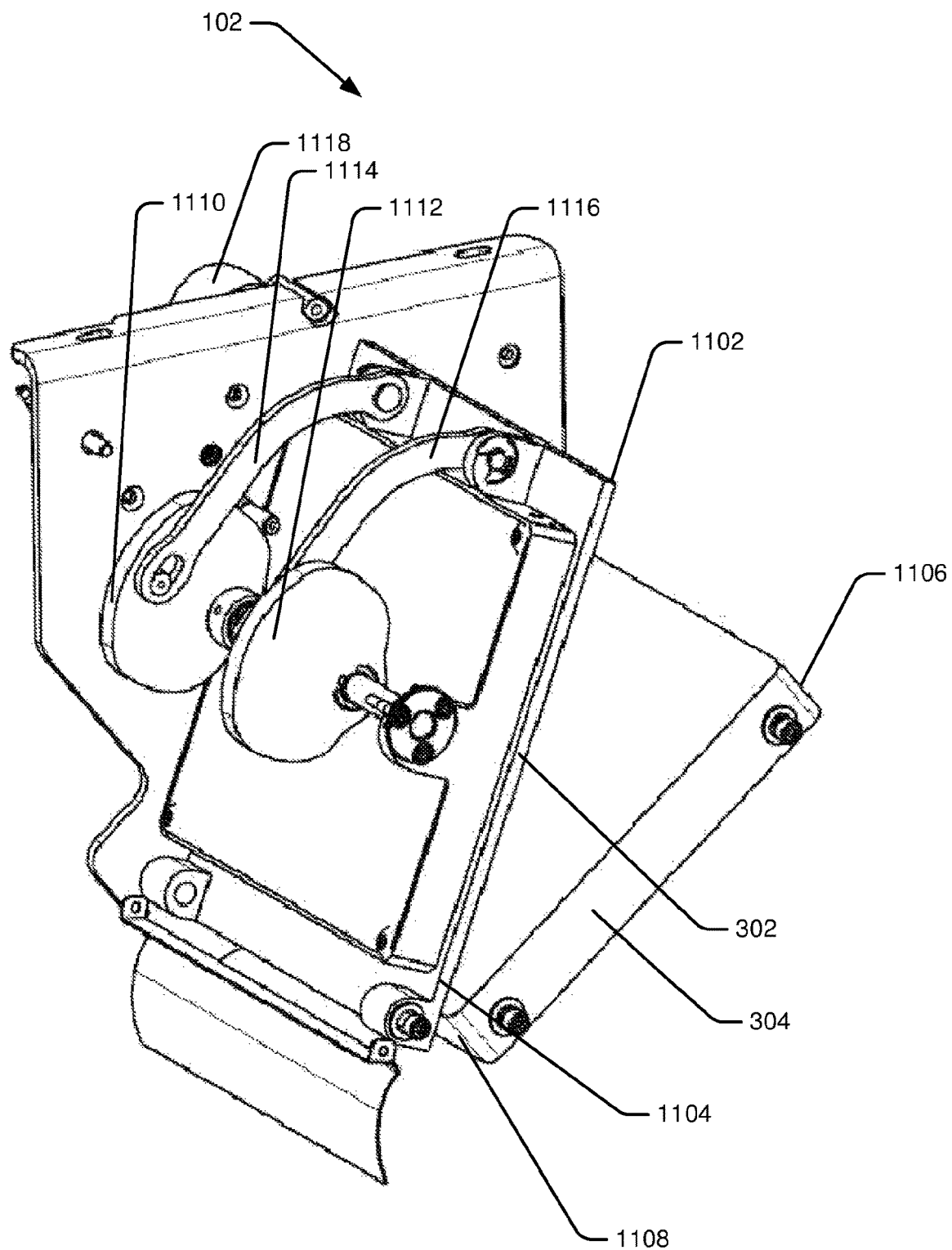
FIG. 11 illustrates a press unit, in accordance with an implementation of the present subject matter.

FIG. 11 illustrates the press unit 102, in accordance with an implementation of the present subject matter. The press unit 102 receives the dough ball from the dough ball preparation unit 106 by action of the transfer arm 1002, and then flattens the dough ball. In addition, the press unit 102 also heats the flattened dough. The press unit 102 includes the top plate 302 and the bottom plate 304. In one implementation, the top plate 302 and the bottom plate 304 are in an inclined arrangement such that their first ends are at greater heights compared to their second ends. In other words, first end 1102 of the top plate 302 is at a greater height compared to the second end 1104 of the top plate 302, and the first end 1106 of the bottom plate 304 is at a greater height compared to the second end 1108 of the bottom plate 304. The bottom plate 304 is held fixed in the inclined arrangement. In contrast, the top plate 302 is hinged at its second end 1104. The hinging of the top plate 302 at its second end 1104 enables swiveling of the top plate 302 about its second end 1104. Therefore, the top plate 302 can move towards and away from the bottom plate 304. To enable swiveling of the top plate 302, the top plate 302 is coupled to a cam-follower arrangement. In an implementation, the top plate 302 is coupled to a first cam 1110 and a second cam 1112 through a first follower 1114 and a second follower 1116, respectively. The first cam 1110 and the second cam 1112 are coupled to a top plate motor 1118, which rotates the first cam 1110 and the second cam 1112. In an example, the top plate motor 1118 is a spur geared stepper motor. The degree of opening and closing of the top plate 302 may be limited by a fifth limit switch and sixth limit switch respectively (not shown in Fig.).

When the dough ball is pushed to the press unit 102, typically, the dough ball sticks to the bottom plate 304 due to the presence of moisture in the dough ball. On arrival of the dough ball into the press unit 102, a first sensor (not shown in Fig.) detects the arrival. The first sensor can be, for example, an infra-red (IR) sensor. Upon the detection, the top plate motor 1118 starts rotating, so that top plate 302 swivels towards the bottom plate 304. In an implementation, the top plate 302 swivels towards the bottom plate 304 when the third limit switch is activated.

The swiveling of the top plate 302 towards the bottom plate 304 causes the dough ball to get pressed between the top plate 302 and the bottom plate 304. This causes the flattening of the dough ball. The top plate 302 is kept pressed on the bottom plate 304 for a predetermined amount of time, so that the dough is flattened, and then is swiveled away from the bottom plate 304. In an example, the predetermined amount of time is 1 second. In one implementation, the gap between the top plate 302 and the bottom plate 304 is kept uniform throughout the area of contact between the top plate 302 and the bottom plate 304 due to the use of similar cams as the first cam 1110 and the second cam 1112, and the use of similar followers as the first follower 1114 and the second follower 1116. This ensures that the thickness of the flattened dough is uniform throughout its surface.

In operation, the bottom plate 304 is heated to a first predetermined temperature. In an example, the first predetermined temperature is about 135° C. Here, heating of the bottom plate 304 to the first predetermined temperature is achieved by provisioning heating elements in the bottom plate 304. The heating elements may be uniformly distributed throughout the bottom plate 304, so that a uniform temperature is achieved throughout the surface of the bottom plate 304. This ensures uniform heating of the flattened dough. In addition to the bottom plate 304, the top plate 302 may also be heated to a fourth predetermined temperature. The fourth predetermined temperature may be the same as or lesser than the first predetermined temperature. The bottom plate 304 and the top plate 302 may be coated with non-stick Teflon.

In order to regulate the heating of the bottom plate 304, so that its temperature is maintained at the first predetermined temperature, in an implementation, the press unit 102 includes a first thermocouple and a first temperature controller (both not shown in Fig.). Similarly, in order to maintain the temperature of the top plate 302 at the fourth predetermined temperature, the press unit 102 can include a second thermocouple and a second temperature controller (both not shown in Fig.).

The heating of the bottom plate 304 and the top plate 302 causes heating, and therefore, loss of moisture from the first face of the flattened dough, which is in contact with the bottom plate 304, and the second face of the flattened dough, which is in contact with the top plate 302. The amount of moisture loss from the first face and the second face, and therefore, the thickness of the flattened dough, depends on the temperature of the bottom plate 304 and the top plate 302 and the time for which the surfaces of the flattened dough are in contact with the bottom plate 304 and the top plate 302. The thickness of the flattened dough also depends on the pressure exerted on the flattened dough by the top plate motor 1118. Therefore, to vary the thickness and softness of the bread formed, the temperature of the bottom plate 304, the temperature of the top plate 302, the time period for which the top plate 302 presses the flattened dough, and the pressure exerted by the top plate motor 1118 can be varied.

In an implementation, in order to vary the thickness of the bread formed, the processor adjusts the time period for which the top plate 302 presses the flattened dough. The processor may adjust the time period based on a thickness value of the bread selected by a user operating the apparatus 100. In another implementation, the processor may adjust the temperature of the top plate 302 and/or the bottom plate 304 based on the thickness value selected by the user. In a further implementation, the pressure exerted by the top plate motor 1118 can be varied based on the thickness value selected by the user. Further, in an implementation, to vary the thickness of the bread formed, the top plate 302 can be moved in a vertical direction, i.e., upwards and downwards. Based on the thickness value selected by the user, the top plate 302 may be moved by predetermined amount, upwards or downwards, to vary the gap between the plates upon swiveling of the top plate 302.

Since the top plate 302 swivels away from the bottom plate 304 after the predetermined time period, the second face of the flattened dough loses lesser moisture and is heated to a lesser extent compared to the first face. In other words, the first face is heated more than the second face. The heating of the first face and the second face by the press unit 102 is also known as preheating.

Since the first face loses moisture due to heating of the bottom plate 304, the tendency of the flattened dough to stick to the bottom plate 304 decreases with the passage of time. Therefore, when the flattened dough loses its tendency to stick to the bottom plate 304, the flattened dough glides out from the gap between the top plate 302 and the bottom plate 304. This is due to the inclined arrangement of the top plate 302 and the bottom plate 304. As mentioned earlier, the flipper is connected to at least one of the second end 1104 of the top plate 302 and the second end 1108 of the bottom plate 304. Therefore, when the flattened dough glides out of the gap, it tends to come into contact with the flipper.

Figure 12:
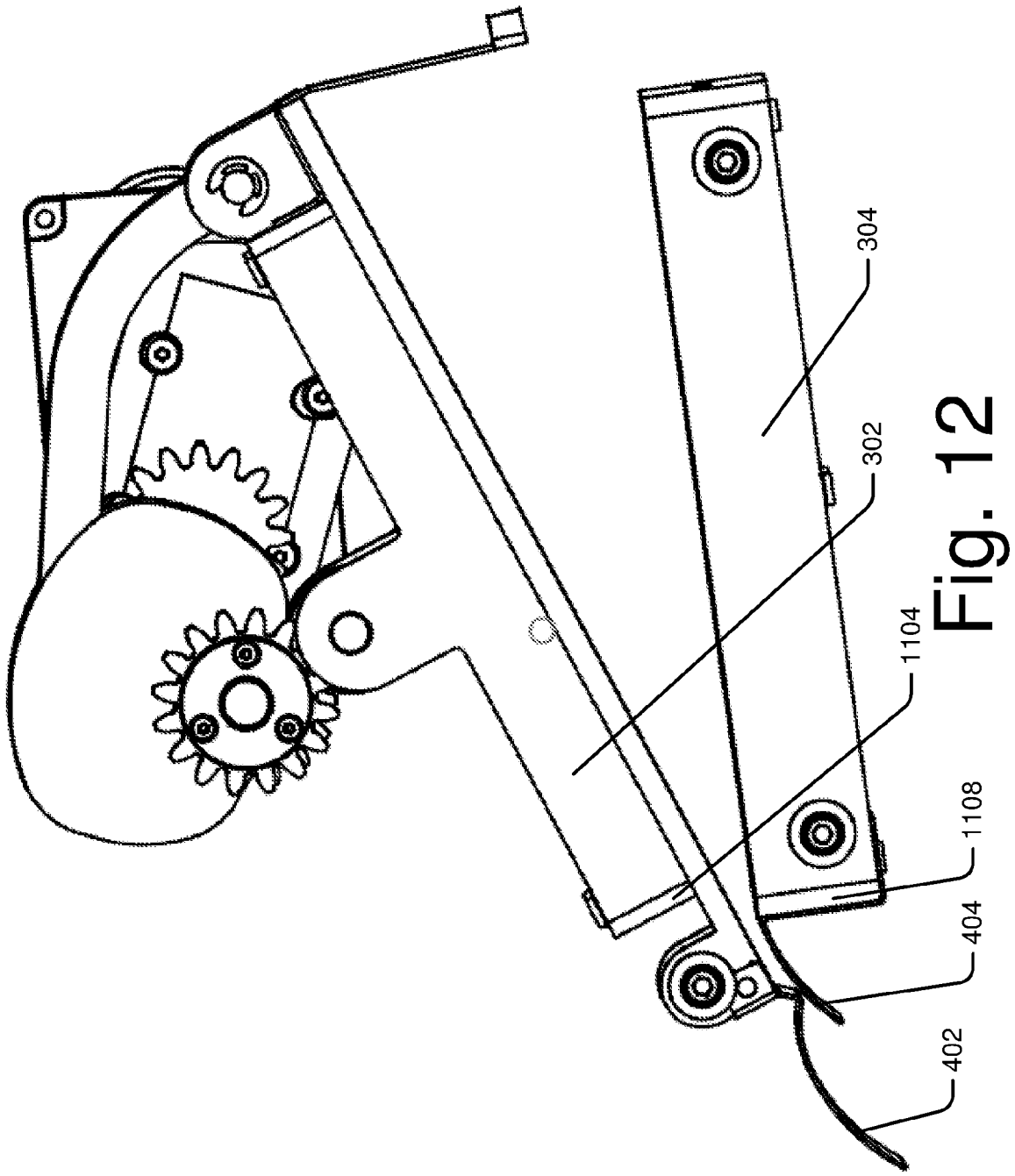
FIG. 12 illustrates a side view of the press unit, in accordance with an implementation of the present subject matter.

FIG. 12 illustrates the side view of the press unit 102, in accordance with an implementation of the present subject matter. The flipper includes at least one of the top flipper 402 and the bottom flipper 404. The top flipper 402 extends from the second end 1104 of the top plate 302 in the form a flap. Similarly, the bottom flipper 404 extends from the second end 1108 of the bottom plate 304 in the form a flap. Therefore, when the flattened dough glides out of the press unit 102, the flipper guides the flattened dough.

The bottom flipper 404 has a curvature, so that when the flattened dough comes into contact with the bottom flipper 404 while gliding out of the press unit 102, the flattened dough follows a curved path, and gets flipped. In other words, the first face, which was facing the bottom plate 304 before gliding out of the press unit, faces upwards after passing through the bottom flipper 404. Similarly, the second face, which was facing the top plate 302 before gliding out of the press unit 102, faces downwards after passing through the bottom flipper 404. When the flattened dough comes in contact with the top flipper 402 during its gliding motion, the top flipper 402 restricts the gliding motion. This causes the flattened dough to fall downwards after getting flipped. The action of the bottom flipper 404 causing the flattened dough to curve and the restriction of the flattened dough by the top flipper is referred to as guiding. Thus, when the flattened dough comes in contact with either the top flipper 402 or the bottom flipper 404, the flattened dough gets flipped. The flipping of the flattened dough by the top flipper 402 or the bottom flipper 404 is commonly referred to as a one-flip mechanism.

The flattened dough coming out of the press unit 102, after coming in contact with at least one of the top flipper 402 and the bottom flipper 404, falls into the cooking unit 104, which is placed below the press unit 102.

Figure 13:
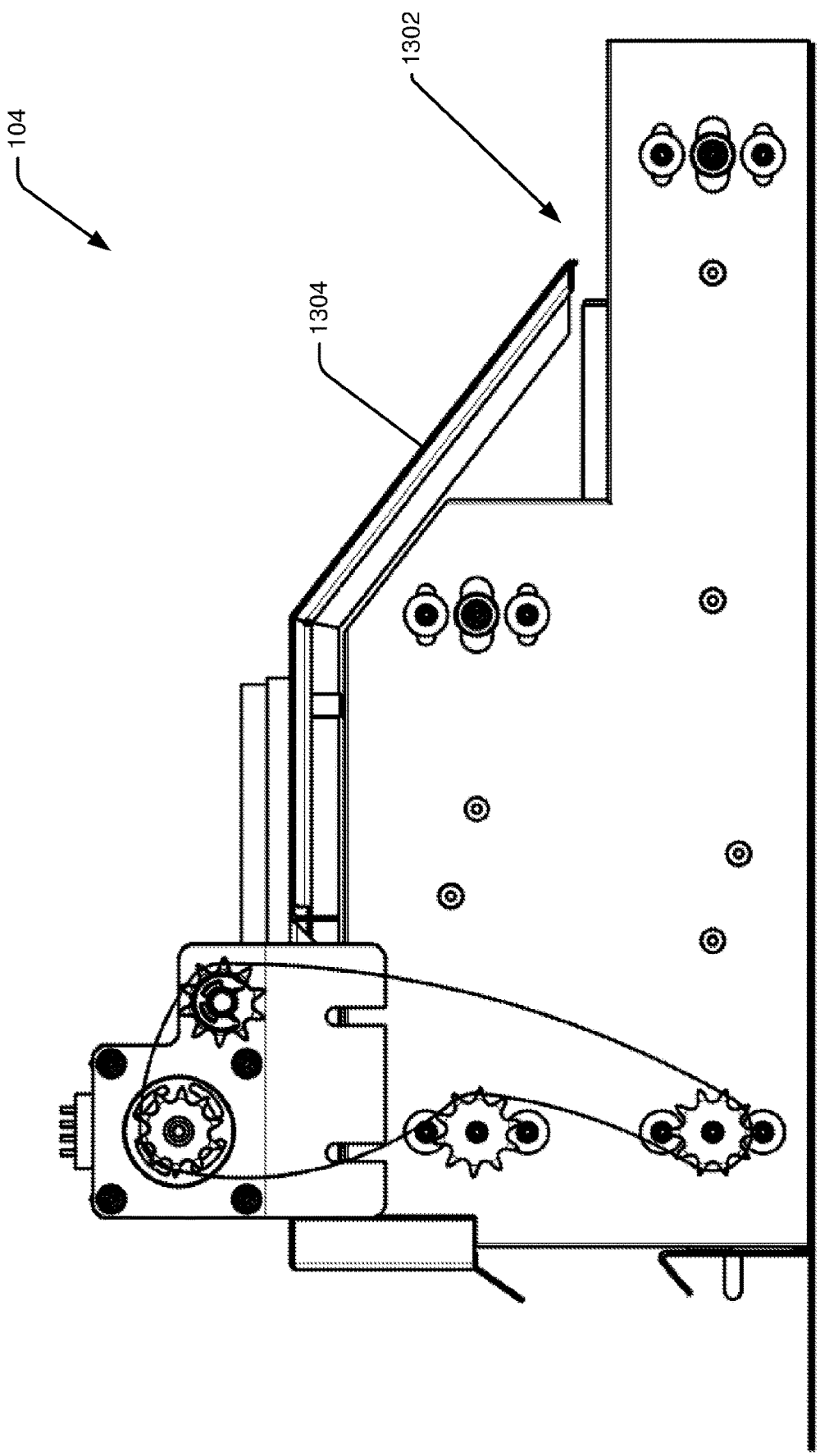
FIG. 13 illustrates a side view of cooking unit, in accordance with an implementation of the present subject matter.

FIG. 13 illustrates a side view of the cooking unit 104, in accordance with an implementation of the present subject matter. The cooking unit 104 includes the cooking surface (not shown in Fig.). The flattened dough falls from the press unit 102 to the cooking unit 104 in the direction indicated by the arrow 1302. A flap 1304 in the cooking unit 104 prevents heat in the press unit 102 from getting transferred to the cooking unit 104. For this, the flap 1304 may be made of a heat insulated material. The flattened dough falls on a first portion of the cooking surface. Since the flattened dough is flipped, the first face of the flattened dough faces upwards, and the second face of the flattened dough faces the cooking surface. The first portion of the cooking surface is heated to a second predetermined temperature. Therefore, the second face gets heated for a predetermined cooking time. The predetermined cooking time can be, in an example, in a range of about 4-5 minutes. In an example, the second predetermined temperature is about 220° C. In an implementation, the heating of the cooking surface is achieved by provisioning heating elements in the cooking surface. The heating elements may also be provisioned beneath the cooking surface. The cooking surface may be coated with non-stick Teflon. The heating of the first face initially (by the press unit 102), and heating the second face later (by the cooking surface) simulates a manual cooking process, in which the first face of the flattened dough is heated, the flattened dough is flipped, and then the second face of the flattened dough is heated. The heating of the second face causes cooking of the dough, thereby, preparing the bread.

Figure 14:
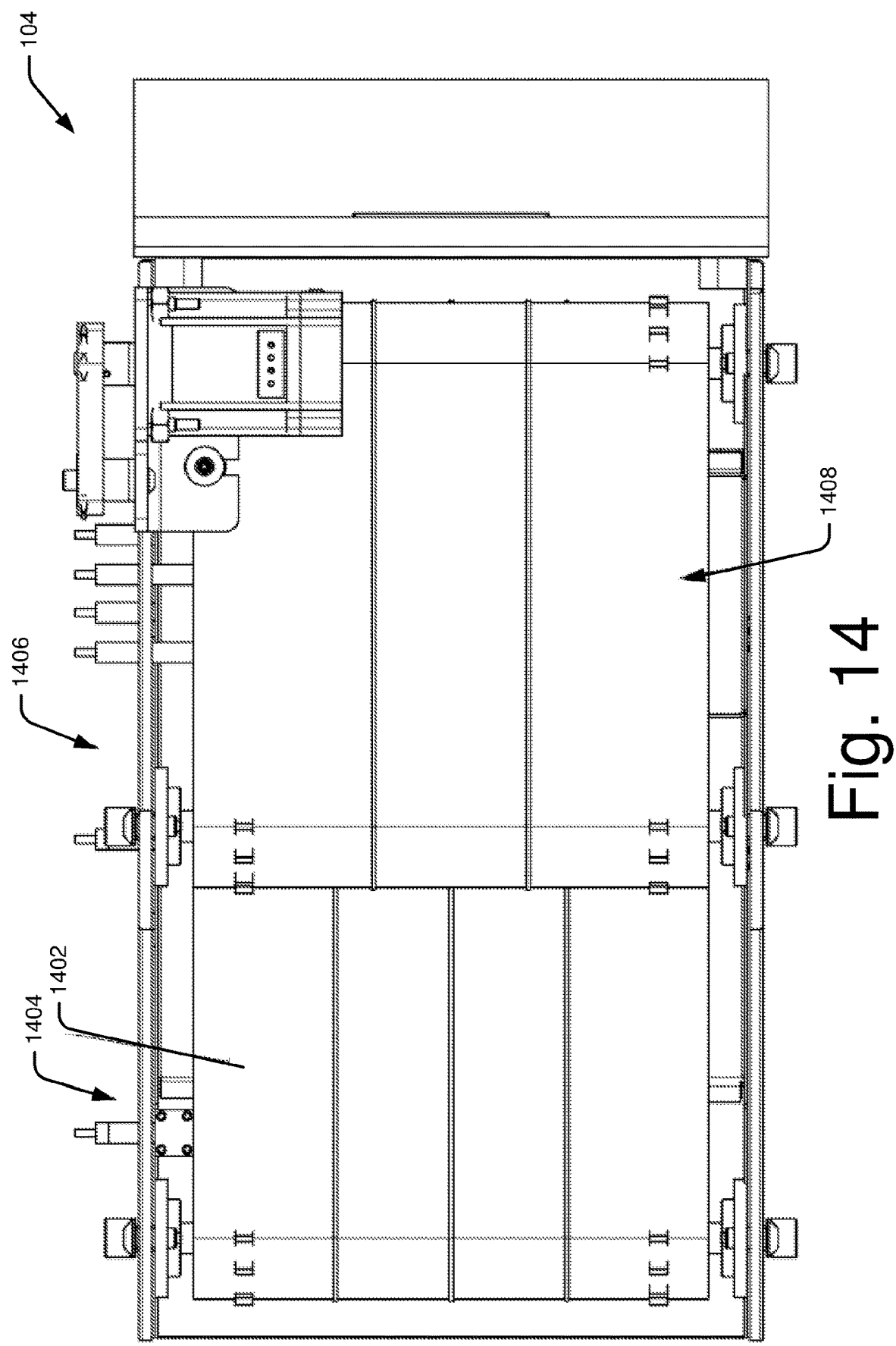
FIG. 14 illustrates the top view of the cooking unit, in accordance with an implementation of the present subject matter.

FIG. 14 illustrates a top view of the cooking unit 104, in accordance with an implementation of the present subject matter. The cooking unit includes the cooking surface 1402. The cooking surface 1402 may be broadly divided into a first portion 1404 and a second portion 1406. In an implementation, the second portion 1406 of the cooking surface 1402 is enclosed from the top by a roof 1408. The roof 1408, together with the second portion 1406 of the cooking surface 1402, forms a puffing unit, in which the bread gets puffed. Subsequent to the cooking of the bread on the first portion 1404 of the cooking surface 1402, the bread may be passed on to the second portion 1406. The bread may be passed on to the second portion 1406 upon elapse of a fifth predetermined time after the flattened dough fell on the first portion 1404 of the cooking surface.

The roof 1408 can be heated to a third predetermined temperature by heating elements for puffing the bread. In an example, the third predetermined temperature is about 350° C. The bread, which is exposed to the radiative heat from the roof 1408, gets puffed. The second portion 1406 of the cooking surface 1402 may also be heated. The temperature to which second portion 1406 is heated is lesser than the second predetermined temperature, to prevent the second face of the bread from getting burnt. In an example, this temperature is 120° C.

The time period for which the flattened dough is allowed to remain on the first portion 1404 and for which the bread is allowed to remain on the second portion 1406 can be preconfigured, to ensure that the flattened dough gets cooked and the bread gets puffed.

In an implementation, the cooking surface 1402 includes a conveyor belt (not shown in Fig.) for moving the bread. Therefore, the bread may be moved from the first portion 1404 to the second portion 1406 by the conveyor belt. The conveyor belt may keep moving to ensure its uniform heating by the heating elements underneath it. The conveyor belt may be moved by a conveyor motor, to which the conveyor belt is coupled. In an implementation, the conveyor belt is made of a sheet of Teflon.

In an implementation, the conveyor belt stops moving when a second sensor in the press unit 102 detects departure of the flattened dough from the press unit 102, so that the flattened dough remains on the first portion 1404 of the cooking surface 1402. The second sensor may be, for example, an IR sensor. The conveyor belt may stop moving a predetermined amount of time after the second sensor detects the departure of the flattened dough. In an example, this predetermined amount of time is 2 seconds. The conveyor belt may stay still for the fifth predetermined time in the first portion 1404 of the cooking surface. In an example, the fifth predetermined time is 35 seconds. Upon elapse of the fifth predetermined time, the conveyor belt may be moved again to move the bread to the second portion 1406 of the cooking surface 1402. The conveyor belt may stay still again for a period of time when the bread reaches the second portion 1406, so that the bread gets puffed. Upon elapse of this period of time, the conveyor belt may be moved to deliver the cooked bread for consumption. The delivery of the cooked bread from the cooking surface 1402 can be detected by a third sensor (not shown in Fig.). The third sensor can be, for example, an IR sensor.

Although the first portion 1404 and the second portion 1406 of the cooking surface 1402 are shown as two different portions, in an implementation, the second portion 1406 is same as the first portion 1404. In other words, the first portion 1404 of the cooking surface 1402 may be enclosed by the roof 1408.

In another implementation, the cooking surface 1402 includes a cooking plate that can be moved by a scissor lift mechanism, a linear actuator, or a robotic arm attached to the cooking plate. The scissor lift mechanism, linear actuator, or the robotic arm can start moving when the second sensor detects the departure of the flattened dough from the press unit 102. In one example, the arrangement of the heating elements can be provided uniformly at the cooking plate bottom. The cooking plate may be made of a conductive light weighted material with Teflon coating.

The scissor lift mechanism can facilitate moving the cooking plate from the first portion 1404 to the second portion 1406. Further, the scissor lift mechanism can enable elevation of the bread in the second portion 1406, thus taking the bread away from the cooking surface 1402.

Figure 15:
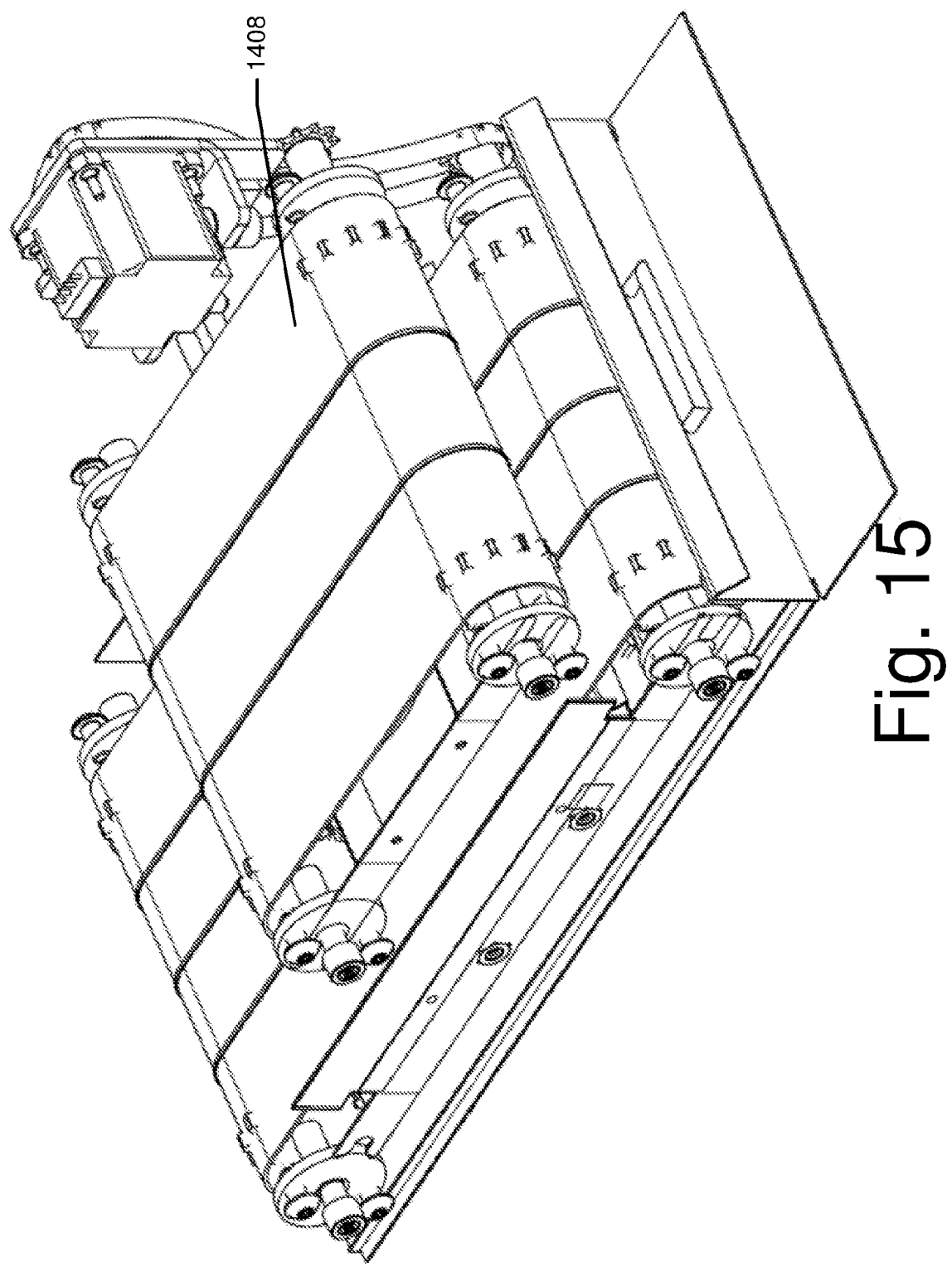
FIG. 15 illustrates a perspective view of the cooking unit with its top cover removed, in accordance with an implementation of the present subject matter.

FIG. 15 illustrates a perspective view of the cooking unit 104 with its top cover removed, in accordance with an implementation of the present subject matter. The cooking surface 1402 may be covered on its sides by means of side walls that can be heated. This enables heating the flattened dough and the bread from their sides.

The maintenance of the top plate 302, the bottom plate 304, the cooking surface 1402, and the roof 1408 at their designated temperatures (first predetermined temperature, second predetermined temperature, and so on) may be achieved using thermostats, thermocouple, or the like.

In an implementation, the apparatus 100 includes a processor that controls various operations of the apparatus 100. For example, the processor may perform the following functions:

I. instruct the kneading plate transfer unit 806 to move the kneading plate 804 from the base position to the first position, II. instruct the flour motor 508, water peristaltic pump 510, and oil peristaltic pump 512 to dispense the ingredients when the kneading plate 804 moves to the first position, III. instruct the kneading plate transfer unit 806 to move the kneading plate 804 to the second, third, and fourth positions upon elapse of first, second, and third predetermined time periods, IV. instruct the water peristaltic pump 510 to dispense water to the kneading chamber 802 when the kneading plate moves to the second position, V. instruct the oil peristaltic pump 512 to dispense oil to the kneading chamber 802 when the kneading plate moves to the fourth position, VI. instruct the blade motor to rotate the blade 902, VII. instruct the kneading plate transfer unit 806 to move the kneading plate 804 to the base position from the fourth position, VIII. instruct the transfer mechanism 202 to move the transfer arm 808 when the kneading plate 804 moves to the base position, IX. instruct the top plate motor 1118 to swivel the top plate 302 towards the bottom plate 304 upon detection by the first sensor that the dough ball entered the press unit 102, X. instruct the top plate motor 1118 to swivel the top plate 302 away from the bottom plate 304 after a predetermined period of time, and XI. instruct the conveyor motor to stop moving the conveyor belt when the second sensor detects departure of the flattened dough from the press unit 102, so that the flattened dough gets cooked on the first portion 1404 of the cooking surface 1402.

XII. instruct the conveyor motor to start moving the conveyor belt from the first portion 1404 to the second portion 1406 of the cooking surface.

To perform the above mentioned functions, the processor may be operably connected to the press unit 102, the cooking unit 104, the dough ball preparation unit 106, the dispensing unit 108, the transfer mechanism 202, and the kneading plate transfer unit 806. For example, the processor may be operably connected to the first, second, third, fourth, fifth, and sixth limit switches, and the first, the second, and the third sensors.

The processor can also detect when a motor is jammed, or is malfunctioning due to some error, and can for example, abort the bread preparation operation or provide an error signal. To enable detection of motor jamming or its malfunction, in an implementation, the processor can monitor whether a motor has reached its designated position after elapse of a predetermined period of time. If the motor has not reached the designated position after the predetermined period of time, the processor can determine that the motor has jammed or is malfunctioning.

The processor may be implemented as microprocessors, microcomputers, microcontrollers, digital signal processors, central processing units, state machines, logic circuitries, and/or any devices that manipulate signals based on operational instructions. Among other capabilities, the processor may fetch and execute computer-readable instructions stored in a memory. The functions of the processor may be provided through the use of dedicated hardware as well as hardware capable of executing machine readable instructions.

Figure 16A:
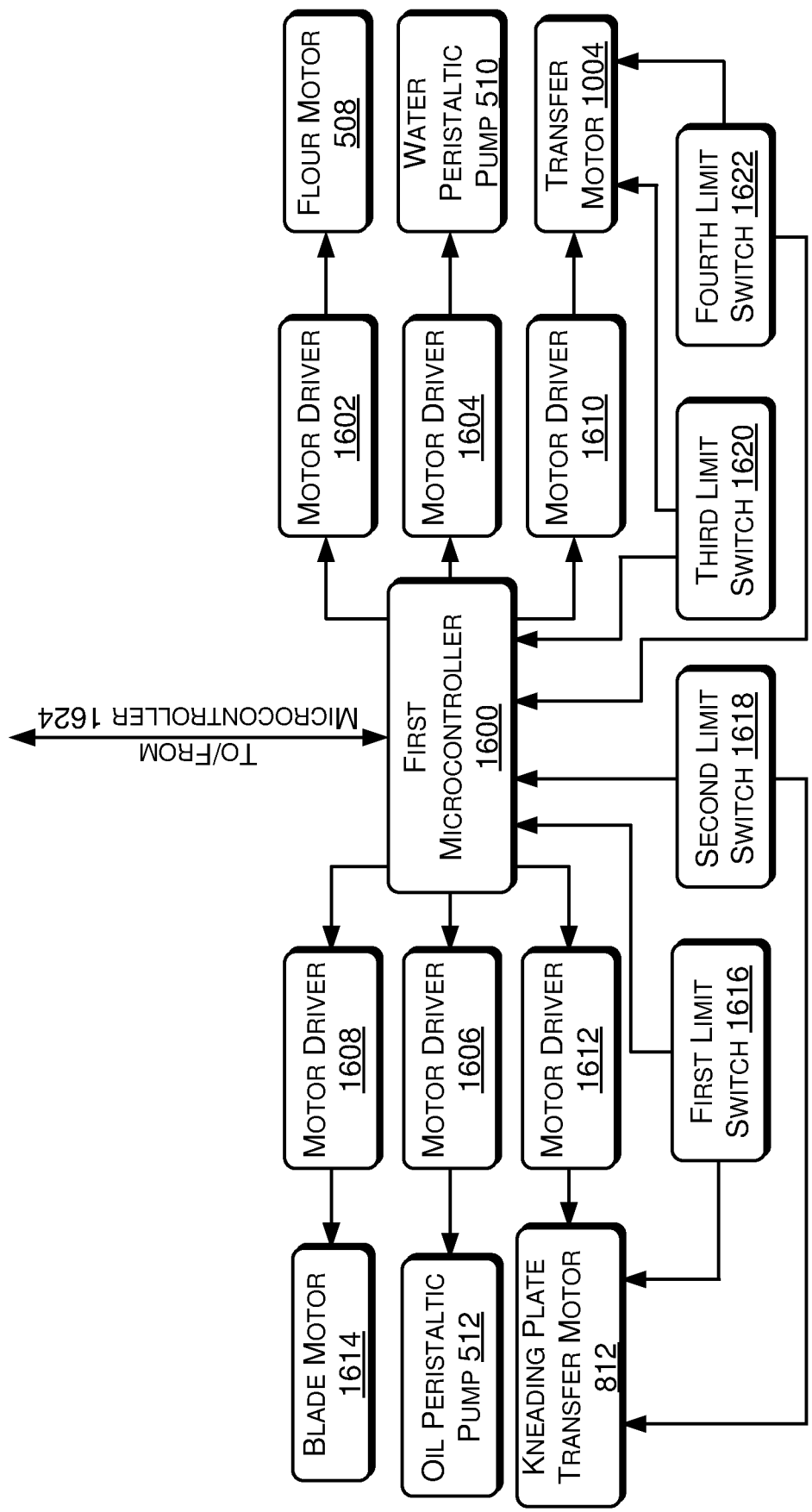
FIG. 16(a) illustrates the connections of a first microcontroller, in accordance with an implementation of the present subject matter.

In an implementation, the processor is implemented as two microcontrollers. The connections of the two microcontrollers to the various components of the apparatus 100 are schematically illustrated in FIG. 16(*a*) and FIG. 16(*b*). However, it will be understood that, in other implementations, more or less number of microcontrollers may be used.

FIG. 16(*a*) illustrates the connections of a first microcontroller 1600, in accordance with an implementation of the present subject matter. The first microcontroller 1600 can control the operations of the dough ball preparation unit 106, the dispensing unit 108, and the transfer mechanism 202. For this, the first microcontroller 1600 is operably connected to motor drivers of the motors in the dough ball preparation unit 106, the dispensing unit 108, and the transfer mechanism 202. For instance, the first microcontroller 1600 is operably connected to motor driver 1602, which drives the flour motor 508, motor driver 1604, which drives the water peristaltic pump 510, motor driver 1606, which drives the oil peristaltic pump 512. As mentioned earlier, the microcontroller 1600 can provide control signals to the motor driver 1604 to adjust the indexing of the water peristaltic pump 510 to vary the amount of water dispensed. Similarly, by providing control signals to the motor driver 1606, the microcontroller 1600 can adjust the indexing of the oil peristaltic pump 512 to vary the amount of oil dispensed.

Similarly, the first microcontroller 1600 is operably connected to motor driver 1608, motor driver 1610, and motor driver 1612, which drive the blade motor (represented by the reference numeral 1614), transfer motor 1004, and the kneading plate transfer motor 812 respectively. This enables controlling operations of these motors by the first microcontroller 1600.

The first microcontroller 1600 is also operably connected to the various limit switches in the dough ball preparation unit 106, the dispensing unit 108, and the transfer mechanism 202. In other words, the first microcontroller 1600 is connected to the first limit switch (represented by the reference numeral 1616), the second limit switch (represented by the reference numeral 1618), the third limit switch (represented by the reference numeral 1620), and the fourth limit switch (represented by the reference numeral 1622). Therefore, when the first limit switch 1616 is activated, indicating that the kneading plate 804 has reached the first position, the first microcontroller 1600 can instruct the motor driver 1602 to start the flour motor 508. When the second limit switch 1618 is activated, indicating that the kneading plate 804 has reached the base position, the first microcontroller 1600 can instruct the motor driver 1610 to start the transfer motor 1004. When the third limit switch 1620 is activated, indicating that the transfer arm 1002 has reached its innermost position, the first microcontroller 1600 can communicate to a second microcontroller 1624 (not shown in Fig.) that controls the movement of the top plate motor 1118, so that the top plate motor 1118 can be started. Similarly, when the fourth limit switch 1622 is activated, indicating that the transfer arm 1002 has reached its outermost position, the first microcontroller 1600 can instruct the motor driver 1612 to start the kneading plate transfer motor 812, so that the kneading plate 804 can be moved to the first position.

Figure 16B:
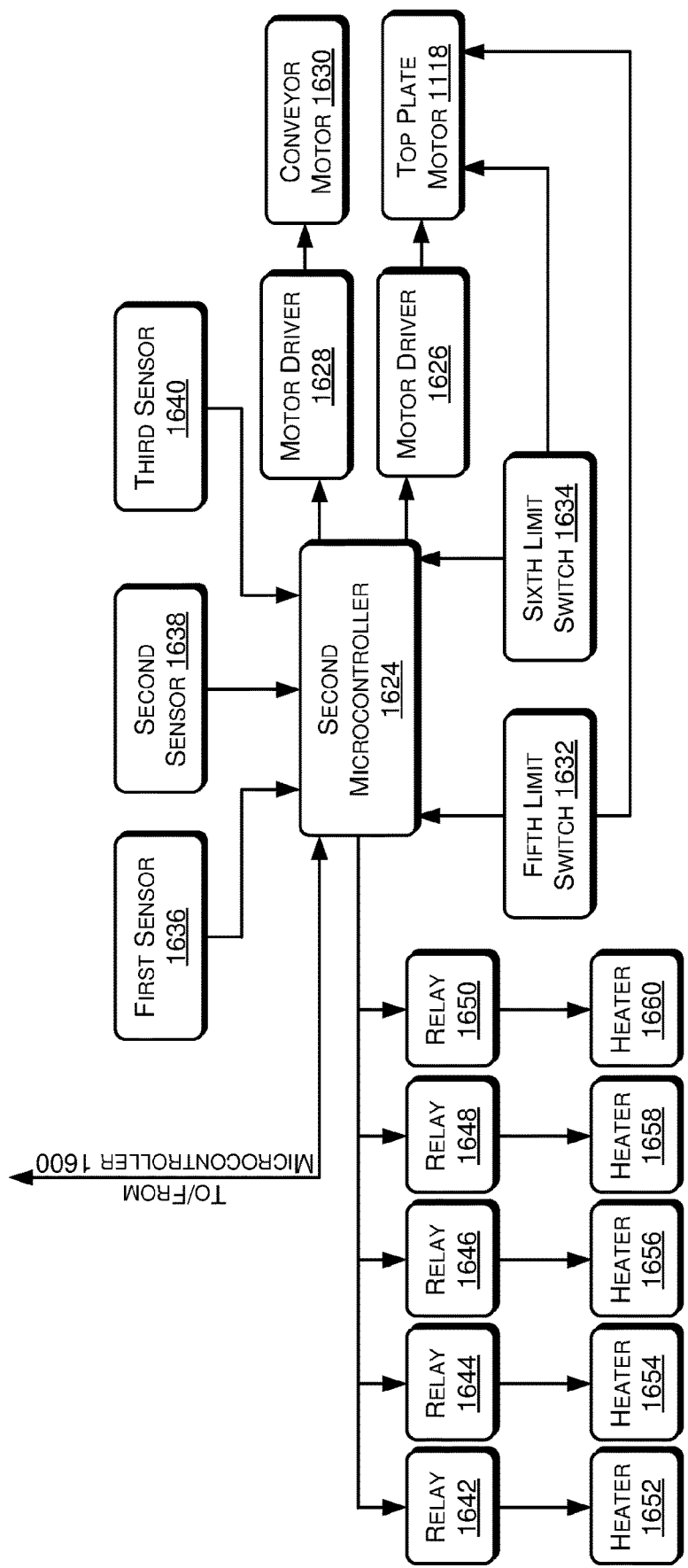
FIG. 16(b) illustrates the connections of a second microcontroller, in accordance with an implementation of the present subject matter.

FIG. 16(b) illustrates the connections of the second microcontroller 1624, in accordance with an implementation of the present subject matter. The second microcontroller 1624 can communicate with the first microcontroller 1600 for sending and receiving information. The communication can be, for example, a serial communication.

The second microcontroller 1624 can control the operations of the press unit 102 and the cooking unit 104. For this, the second microcontroller 1624 is operably connected to motor driver 1626, which drives the top plate motor 1118, and motor driver 1628, which drives the conveyor motor (represented by reference numeral 1630). Since the thickness of the bread depends on the time for which the top plate 302 remains pressed on the bottom plate 304, in an implementation, the second microcontroller 1624 provides control signals to the motor driver 1626 depending on the thickness of the bread selected by the user, so that the time for which the top plate 302 remains pressed on the bottom plate 304 can be varied.

The second microcontroller 1624 is also operably connected to the fifth limit switch (represented by reference numeral 1632) and the sixth limit switch (represented by reference numeral 1634). Further, the second microcontroller 1624 is operably connected to the first sensor (represented by reference numeral 1636), the second sensor (represented by reference numeral 1638), and the third sensor (represented by reference numeral 1640). Therefore, when the second microcontroller 1624 receives an input from the first sensor 1636, indicating that the dough ball has entered the press unit 102, the second microcontroller 1624 can instruct the motor driver 1628 to drive the top plate motor 1118. When the second microcontroller 1624 receives an input from the second sensor 1638, indicating that the dough ball has departed from the press unit 102, the second microcontroller 1624 can instruct the motor driver 1626 to drive the conveyor motor 1630. Further, when the second microcontroller 1624 receives an input from the third sensor 1640, the second microcontroller 1624 can determine that a cooked bread is delivered for consumption, and can activate a buzzer (not shown in Fig.).

The second microcontroller 1624 can be operably connected to relays of the heating elements, also referred to as heaters. For example, the second microcontroller 1624 is operably connected to relays 1642, 1644, 1646, 1648, and 1650. These relays are connected to heaters 1652, 1654, 1656, 1658, and 1660 respectively. In an implementation, the heaters 1652 and 1654 are deployed in the press unit 102 and the heaters 1656, 1658, and 1660 are deployed in the cooking unit 104. The second microcontroller 1624 can control of the temperature of the heaters 1652, 1654, 1656, 1658, and 1660.

In an implementation, at least one of the first microcontroller 1600 and the second microcontroller 1624 is operably connected to a display unit (not shown in Fig.) for displaying various information on the display unit and to receive inputs from the user through the display unit.

Figure 17:
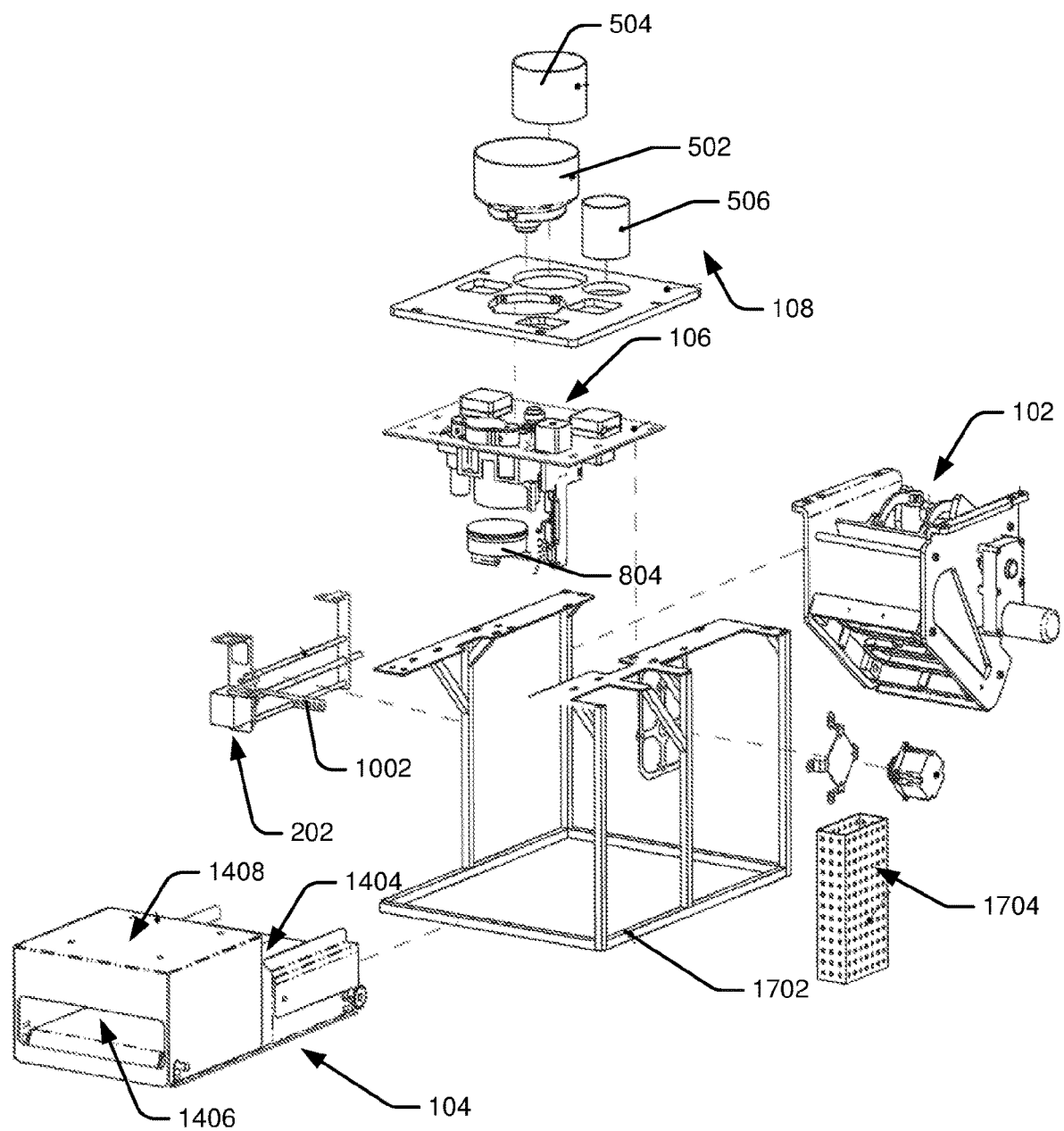
FIG. 17 illustrates an exploded view of the apparatus, in accordance with an implementation of the present subject matter.

FIG. 17 illustrates an exploded view of the apparatus 100, in accordance with an implementation of the present subject matter. As illustrated, the dispensing unit 108 is disposed above all the other units of the apparatus 100. The dough ball preparation unit 106 is placed below the dispensing unit 108 for receiving the ingredients. The flour motor 508, the water peristaltic pump 510, and the oil peristaltic pump 512 may be placed on the dough ball preparation unit 106. The transfer arm 1002 is at the level of the base position of the kneading plate 804 for pushing the dough ball from the kneading plate 804 to the press unit 102. The cooking unit 104, disposed below the press unit 102, receives the flattened dough at the first portion 1404 of the cooking surface 1402. The various units of the apparatus 100 are integrated to form a single piece construction with the help of chassis assembly 1702. The apparatus 100 is powered by the power supply module 1704.

In an implementation, the apparatus 100 may include a display unit to display various operations of the bread preparation operation.

Figure 18:
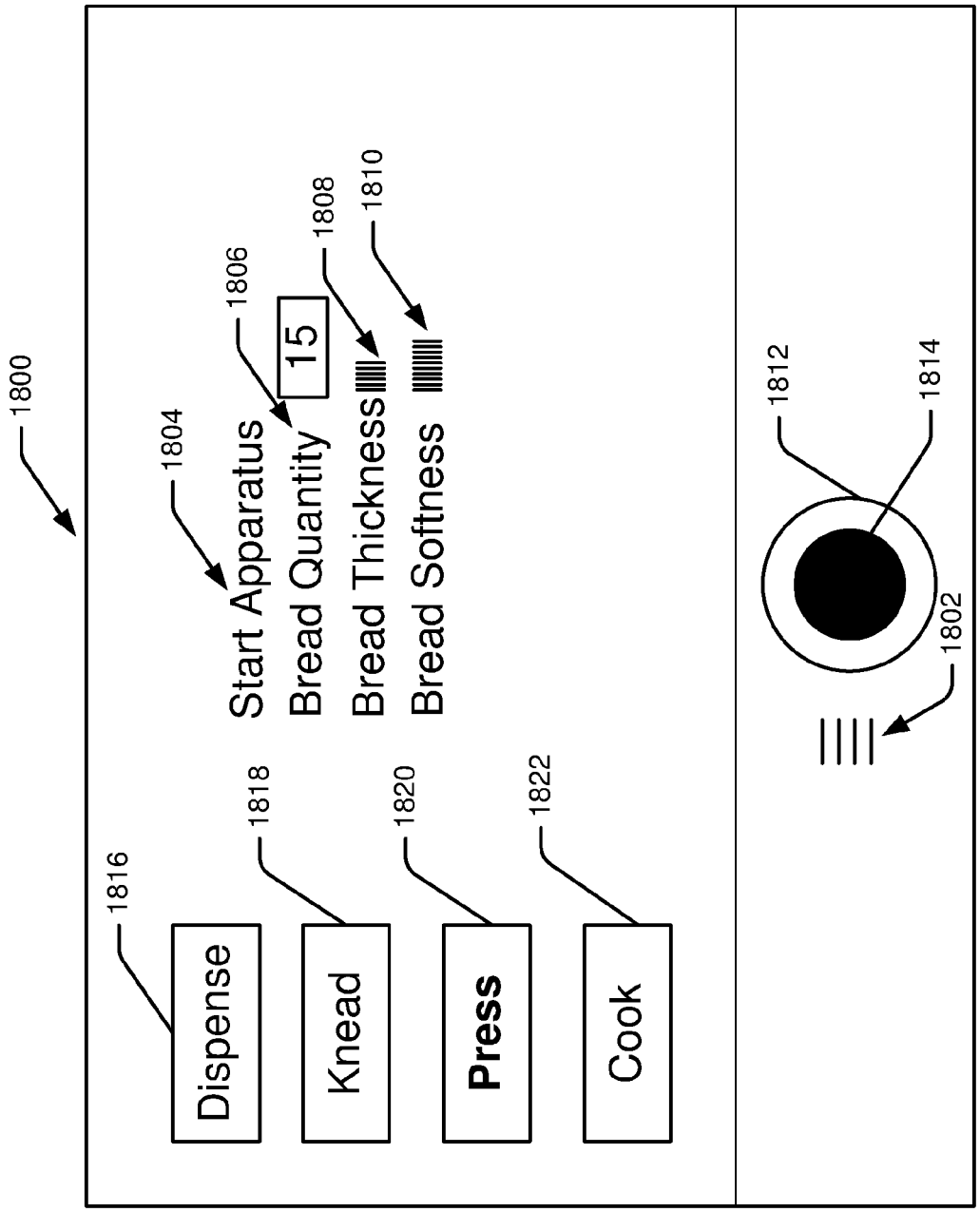
FIG. 18 illustrates a display unit, in accordance with an implementation of the present subject matter.

FIG. 18 illustrates a display unit 1800, in accordance with an implementation of the present subject matter. The display unit 1800 may be, for example, a Liquid Crystal Display (LCD) unit. The display unit 1800 may include a menu button 1802, on pressing of which various options related to operation of the apparatus 100 may be displayed. For example, on pressing of the menu button 1802, the options 1804, 1806, 1808, and 1810 may be displayed. To navigate through the options, the display unit 1800 may also include a dial 1812, such as a jog dial. By rotating the dial 1812 clockwise and anti-clockwise, various options may be navigated. To select an option, an enter key 1814 may also be provided. In an example, by rotating the dial clockwise once, and then pressing the enter key 1814, the option 1804 is selected, and the bread preparation operation of the apparatus 100 is started. Similarly, by rotating the dial 1812 twice and then pressing the enter key 1814, the option 1806 is selected, and the user is allowed to enter the number of breads required. To enter the number of breads, the user can rotate the dial 1812. The entered number of breads may then be displayed on the display 1800. Although the display unit 1800 is shown to display four options, the display unit 1800 can also display options for other operations, such as cleaning and powering off the apparatus 100. Further, the display unit 1800 can also indicate the operation currently being performed by the apparatus 100 through items 1816, 1818, 1820, and 1822. For example, as illustrated in FIG. 18, the item 1820 is shown in bold, indicating that the apparatus 100 is currently performing the pressing operation.

Figure 19:
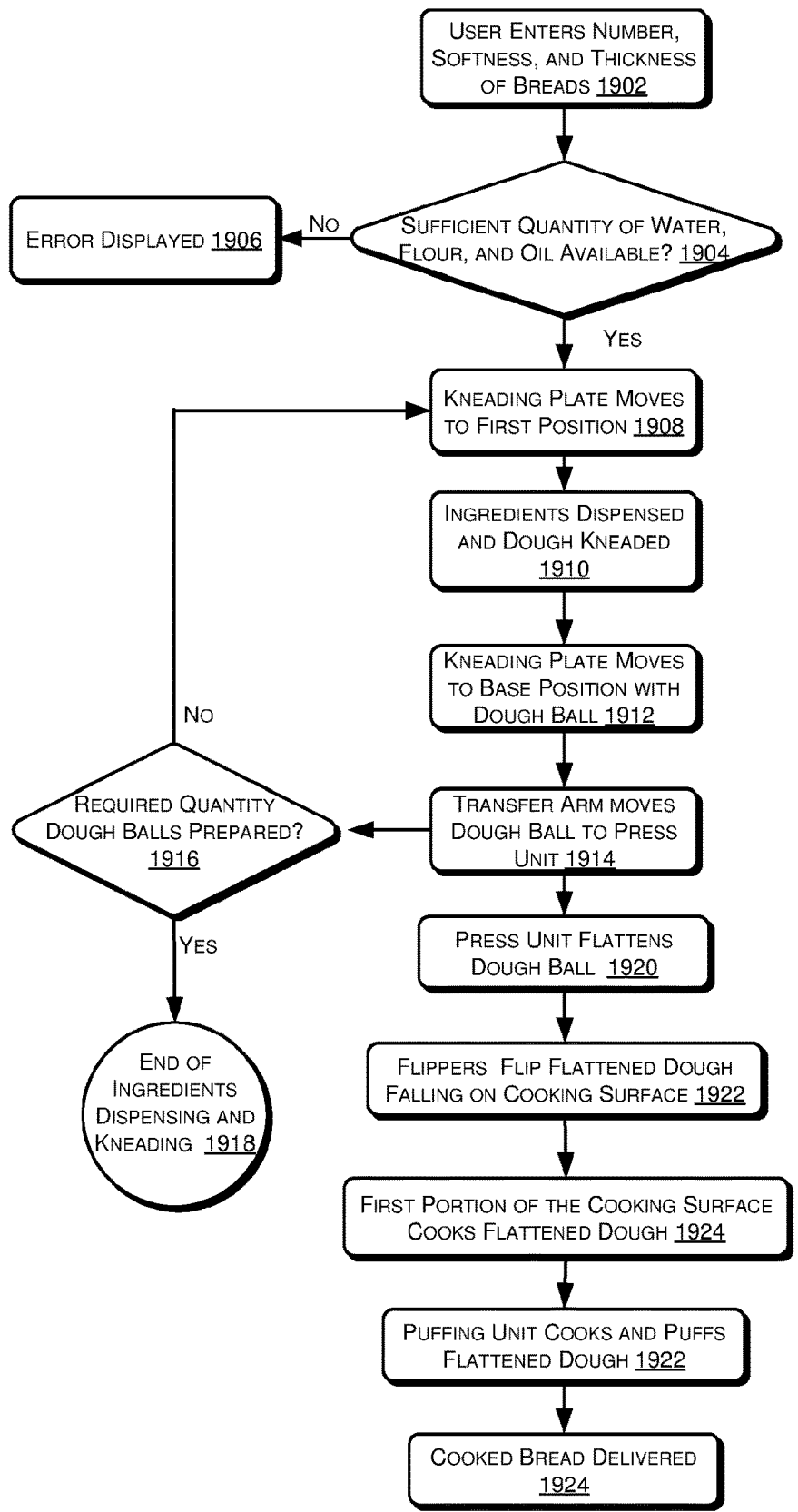
FIG. 19 illustrates a schematic flow of operations in the apparatus for the preparation of the bread, in accordance with an implementation of the present subject matter.

FIG. 19 illustrates a schematic flow of operations in the apparatus 100 for the preparation of the bread, in accordance with an implementation of the present subject matter.

At block 1902, a user enters the number, softness, and thickness of the breads required. The user can enter the above details using the display unit 1800. The user may also select one of a plurality of preprogrammed options in lieu of entering the details.

At block 1904, a checking is performed as to whether sufficient quantities of flour, water, and oil are available for preparing the breads as per the requirement of the user. The checking can be performed by the processor by, for example, weighing the ingredient chambers.

At block 1906, if the sufficient quantities of the ingredients are not available, an error may be displayed on the display unit 1800.

If the sufficient quantities of the ingredients are available, at block 1908, the kneading plate 804 is moved to the first position, in order to initiate the cooking process.

At block 1910, the ingredients are dispensed and the dough is kneaded. This step includes dispensing of the ingredients by the flour motor 508, the water peristaltic pump 510, and the oil peristaltic pump 512, movement of the kneading plate 804 to the various positions, and rotation of the blade 902, which are explained in detail earlier. Further, as explained earlier, the step results in the formation of a dough ball. The amount of ingredients dispensed can be varied based on the softness of the bread entered by the user.

At block 1912, after the dough ball is formed, the kneading plate 804 moves to the base position.

At block 1914, the transfer arm 1002 transfers the dough ball from the kneading plate 804 to the press unit 102. As explained earlier, in order to transfer the dough ball, the transfer arm moves from its outermost position to its innermost position. Upon transferring the dough ball to the press unit 102, the transfer arm 1002 once again returns to its outermost position.

At block 1916, the processor determines if the required number of dough balls, as entered by the user at block 1902, have been prepared. If the required number of dough balls have not been prepared, the processor instructs the motor driver 1612 to start the kneading plate transfer motor 812, so that the kneading plate is moved to the first position. Thereafter, the blocks 1908-1914 are repeated while the previous dough ball is flattened and cooked. Thus, while one dough ball is being prepared, another dough ball is flattened and cooked in parallel. In other words, the dough ball preparation process and the dough ball flattening and cooking process are performed simultaneously, so that the time involved in preparation of one unit of bread is minimized.

If the required number of dough balls have been prepared, at block 1918, the ingredients kneading and dispensing process completes, as all the dough balls will have been sent for flattening and cooking as soon as they were prepared.

At block 1920, the press unit 102 flattens the dough ball to prepare the flattened dough. The time period for which the top plate 302 is kept pressed on the bottom plate 304 can be determined by the processor based on the thickness of the bread entered by the user. The processor may also determine the temperature to which the top plate 302 and/or the bottom plate 304 have to be heated based on the thickness entered by the user. The processor may also determine the pressure to be exerted by the top plate motor 1118 based on the thickness entered by the user.

At block 1922, the flattened dough departs from the press unit 102 through the top flipper 402 and the bottom flipper 404. As explained earlier, the movement of the flattened dough through the flippers cause the flipping of the flattened dough before falling on the cooking surface 1402, which is sensed by the second sensor 1638.

At block 1924, the first portion 1404 of the cooking surface 1402 heats the flattened dough in order to prepare the bread. As explained earlier, the conveyor belt may stop moving in order to enable heating of the flattened dough in the first portion 1404 of the cooking surface 1402. The conveyor belt may then take the bread to the second portion 1406 of the cooking surface 1402. In an implementation, a sensor indicates that the flattened dough has entered the first portion 1404 of the cooking surface 1402 completely. If the sensor does not indicate so, the processor may indicate an error on the display unit 1800.

At block 1926, the puffing unit, formed by the roof 1408 and the second portion 1406, puffs the bread by providing heat from the top and cooking the bread with overhead heat. This completes the process of bread preparation.

At block 1928, the bread is delivered out of the apparatus 100. In an implementation, if the third sensor does not provide an indication to the processor, indicating that the bread is not delivered out of the apparatus 100, the processor may indicate an error on the display unit 1800.

The apparatus 100 of the present subject matter is compact, simple to operate, and low maintenance. Further, the apparatus 100 enables easy programming and control. Still further, the apparatus 100 prepares flipped and puffed breads, similar to the breads obtained from manual cooking.

Although the present subject matter has been described with reference to specific embodiments, this description is not meant to be construed in a limiting sense. Various modifications of the disclosed embodiments, as well as alternate embodiments of the subject matter, will become apparent to persons skilled in the art upon reference to the description of the subject matter.

We claim:

1. An apparatus for preparation of breads, the apparatus comprising:
   a press unit to receive a dough ball and to flatten the dough ball, the press unit comprising:
   a bottom plate in an inclined arrangement such that a first end of the bottom plate is at a greater height relative to a second end of the bottom plate, the bottom plate heatable to a first predetermined temperature, wherein the bottom plate comprises a heating element for heating the bottom plate;
   a top plate disposed above the bottom plate, the top plate hinged at its second end and swivelable about its second end towards and away from the bottom plate, wherein the dough ball is to be received between the bottom plate and the top plate for flattening the dough ball and heating a first face of a flattened dough in contact with the bottom plate; and
   a flipper connected to at least one of the second end of the bottom plate and the second end of the top plate to receive the flattened dough and to guide the flattened dough to a cooking surface below the press unit, the guiding enabling a second face of the flattened dough to come in contact with the cooking surface, wherein the flipper extends from the second end of at least one of the top plate and the bottom plate in the form of a flap; and the cooking surface, wherein at least a first portion of the cooking surface is heated to a second predetermined temperature, for heating the second face of the flattened dough, the heating forming the bread, wherein the cooking surface is provisioned with another heating element to heat the first portion of the cooking surface.

2. The apparatus as claimed in claim 1, comprising:
a dough ball preparation unit for preparation of the dough ball from ingredients for preparation of the bread, the dough ball preparation unit comprising:
 a kneading chamber;
 a blade rotatable in the kneading chamber for mixing the ingredients and kneading the ingredients;
 a kneading plate;
 a kneading plate transfer unit coupled to the kneading plate to vertically move the kneading plate upwards and downwards inside the kneading chamber to form the dough ball and to move the kneading plate inside and outside the kneading chamber;
 a processor operably connected to the kneading plate transfer unit to instruct the kneading plate transfer unit to:
  move the kneading plate from base position of the kneading plate, outside the kneading chamber, to a first position, inside the kneading chamber, for initiation of the kneading;
  move the kneading plate to a plurality of positions inside the kneading chamber after elapse of predetermined time periods; and
  move the kneading plate to the base position of the kneading plate upon preparation of the dough ball.

3. The apparatus as claimed in claim 2, comprising a dispensing unit comprising:
 a plurality of ingredient chambers, each ingredient chamber of the plurality of ingredient chambers for storing an ingredient for preparation of the bread; and
 a dispensing mechanism connected to each ingredient chamber for dispensing a predetermined amount of the ingredient stored in the ingredient chamber to the kneading chamber.

4. The apparatus as claimed in claim 3, wherein, to move the kneading plate to the plurality of positions inside the kneading chamber, the processor instructs the kneading plate transfer unit to:
 move the kneading plate downwards inside the kneading chamber to a second position upon elapse of a first predetermined time after the kneading plate moved to the first position;
 move the kneading plate upwards to a third position upon elapse of a second predetermined time after the kneading plate moved to the second position; and
 move the kneading plate downwards inside the kneading chamber to a fourth position upon elapse of a third predetermined time after the kneading plate moved to the third position.

5. The apparatus as claimed in claim 1, wherein a second portion of the cooking surface is enclosed by a roof, wherein the roof is heatable to a third predetermined temperature by heating elements for puffing the bread.

6. The apparatus as claimed in claim 2, wherein the processor is operably coupled to the dough ball preparation unit, the press unit, a transfer mechanism, and the cooking surface to control rotation of the blade, swiveling of the top plate, movement of a conveyor belt on the cooking surface, and movement of a transfer arm in the transfer mechanism.

7. The apparatus as claimed in claim 1, wherein the top plate is movable in a vertical direction.

8. The apparatus as claimed in claim 1, wherein the press unit comprises a sensor to detect the arrival of the dough ball in the press unit, and wherein the top plate starts swiveling towards the bottom plate on detection of the arrival of the dough ball in the press unit.

9. The apparatus as claimed in claim 2, comprising a transfer mechanism for moving the dough ball from the dough ball preparation unit to the press unit, the transfer mechanism comprising:
 a transfer arm for moving the dough ball;
 a transfer shaft along which the transfer arm is to be moved; and
 a transfer motor coupled to the transfer arm to move the transfer arm along the transfer shaft.

10. The apparatus as claimed in claim 1, wherein the cooking surface comprises a conveyor belt for moving the bread.

11. The apparatus as claimed in claim 10, wherein the press unit comprises a sensor to detect departure of the flattened dough from the press unit, and wherein the conveyor belt stops moving on detection of the departure of the flattened dough from the press unit.

12. The apparatus as claimed in claim 3, wherein the plurality of ingredient chambers comprises a flour chamber for storing flour and the dispensing mechanism comprises a flour motor for dispensing a predetermined weight of flour from the flour chamber to the kneading chamber.

13. The apparatus as claimed in claim 3, wherein the plurality of ingredient chambers comprises a liquid chamber for storing a liquid ingredient and the dispensing mechanism comprises a peristaltic pump for dispensing a predetermined volume of the liquid ingredient to the kneading chamber.

14. The apparatus as claimed in claim 4, wherein upon movement of the kneading plate to the first position, the processor instructs the dispensing mechanism connected to each ingredient chamber of the plurality of ingredient chambers to:
 dispense the ingredients from each ingredient chamber to the kneading chamber, the ingredients comprising flour, water, and oil and the plurality of ingredient chambers comprising flour chamber, water chamber, and oil chamber,
 wherein upon movement of the kneading plate to the second position, the processor instructs a dispensing mechanism connected to the water chamber to:
  dispense water to the kneading chamber, and
  wherein upon movement of the kneading plate to the fourth position, the processor instructs a dispensing mechanism connected to the oil chamber to:
  dispense oil to the kneading chamber.

15. The apparatus as claimed in claim 1, wherein the cooking surface comprises side heaters for heating the bread from its sides.

16. The apparatus as claimed in claim 1, wherein the top plate is heatable to a fourth predetermined temperature by heating elements provisioned in the top plate.

17. The apparatus as claimed in claim 1, comprising a battery to power the apparatus.

18. The apparatus as claimed in claim 12, wherein the flour chamber comprises a disk rotatable by the flour motor, the disk comprising a plurality of cavities to dispense a fixed quantity of flour to a flour opening on the kneading chamber.

19. The apparatus as claimed in claim 18, wherein the flour chamber comprises a stationary blade above the flour opening for preventing flour from falling on to a cavity directly above the flour opening and a dispenser blade rotatable by the flour motor for dispensing flour from top of the flour chamber to the plurality of cavities.

20. The apparatus as claimed in claim 2, wherein the blade comprises a spiral portion, an upward extending portion, a downward extending portion, and a center portion, wherein the spiral portion, the upward extending portion, and the downward extending portion enable mixing of the ingredients and a curvature between the center portion and the downward extending portion enable shaping the dough ball.

21. The apparatus as claimed in claim 1, wherein the cooking surface comprises a cooking plate movable by at least one of a scissor lift mechanism, a linear actuator, and a robotic arm.

22. The apparatus as claimed in claim 2, wherein the processor is implemented as a first microcontroller and a second microcontroller.

23. The apparatus as claimed in claim 13, wherein the dispensing mechanism comprises a driver of the peristaltic pump and the processor is to:
provide control signals to the driver of the peristaltic pump to control amount of liquid to be dispensed based on selected softness of the bread.

24. A method for controlling preparation of breads in an apparatus by a processor in the apparatus, the method comprising:
controlling dispensing of ingredients for the preparation of a bread from ingredient chambers, wherein the ingredient chambers comprise a water chamber and an oil chamber, and wherein controlling the dispensing comprises:
adjusting indexing of at least one of a water peristaltic pump that dispenses water from the water chamber and an oil peristaltic pump that dispenses oil from the oil chamber based on the selected softness of the bread;
controlling position of a kneading plate within a kneading chamber for preparation of a dough ball, wherein controlling the position comprises:
controlling movement of the kneading plate to a first position inside the kneading chamber to initiate dispensing of the ingredients; and
controlling movement of the kneading plate to second, third, and fourth positions inside the kneading chamber from first, second, and third positions respectively based on elapse of predetermined time periods;
controlling transfer of the dough ball from the kneading plate to a press unit by a transfer mechanism, wherein controlling the transfer of the dough ball comprises:
receiving indication of activation of a second limit switch, indicating that the kneading plate has reached its base position with the dough ball;
controlling flattening of the dough ball in the press unit, wherein flattening of the dough ball results in the formation of a flattened dough, wherein the press unit comprises:
a bottom plate in an inclined arrangement such that a first end of the bottom plate is at a greater height relative to a second end of the bottom plate, the bottom plate being heatable to a first predetermined temperature, wherein the bottom plate comprises a heating element for heating the bottom plate;
a top plate disposed above the bottom plate, the top plate hinged at its second end and swivelable about its second end towards and away from the bottom plate, wherein the dough ball is to be received between the bottom plate and the top plate for flattening the dough ball and heating a first face of the flattened dough in contact with the bottom plate; and
a flipper connected to at least one of the second end of the bottom plate and the second end of the top plate to receive the flattened dough and to guide the flattened dough to a cooking surface below the press unit, the guiding enabling a second face of the flattened dough to come in contact with the cooking surface, wherein the flipper extends from the second end of at least one of the top plate and the bottom plate,
wherein controlling the flattening comprises:
receiving an indication from a first sensor that the dough ball has entered the press unit; and
controlling swiveling of a top plate motor in the press unit towards the bottom plate in the press unit for flattening the dough ball, wherein at least one of the top plate and the bottom plate is heated for heating the flattened dough; and
controlling cooking and puffing of the flattened dough in a cooking unit for the preparation of the bread, wherein controlling the cooking and puffing comprises:
controlling cooking of the flattened dough on a first portion of the cooking surface in the cooking unit, wherein the cooking surface is provisioned with another heating element to heat the first portion of the cooking surface; and
controlling puffing of the flattened dough on a second portion of the cooking surface.

25. The method as claimed in claim 24, wherein adjusting indexing of the water peristaltic pump comprises providing control signals to a motor driver of the water peristaltic pump and adjusting indexing of the oil peristaltic pump comprises providing control signals to a motor driver of the oil peristaltic pump.

26. The method as claimed in claim 24, wherein controlling cooking and puffing of the flattened dough comprises:
receiving an indication from a second sensor that the flattened dough has departed from press unit, wherein controlling cooking of the flattened dough on the first portion of the cooking surface comprises:
in response to receiving the indication from the second sensor, controlling a conveyor motor in the cooking unit to stop a conveyor belt on which the flattened dough balls, so that the flattened dough gets heated on the first portion of the cooking surface,
wherein controlling puffing of the flattened dough on the second portion of the cooking surface comprises:
controlling the conveyor motor to move the conveyor belt from the first portion of the cooking surface to the second portion of the cooking surface, so that the flattened dough gets puffed on the second portion of the cooking surface.

27. The method as claimed in claim 24, wherein controlling flattening of the dough ball comprises adjusting time period for which the top plate presses the flattened dough based on required thickness of the bread.

\* \* \* \* \*